(12) United States Patent
Saito

(10) Patent No.: US 8,976,999 B2
(45) Date of Patent: Mar. 10, 2015

(54) VEHICLE DETECTION APPARATUS

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 443 days.

(21) Appl. No.: 13/365,321

(22) Filed: Feb. 3, 2012

(65) Prior Publication Data

US 2012/0207348 A1  Aug. 16, 2012

(30) Foreign Application Priority Data

Feb. 16, 2011  (JP) .................................. 2011-030547

(51) Int. Cl.
| G06K 9/00 | (2006.01) |
| G08G 1/04 | (2006.01) |
| G06K 9/32 | (2006.01) |
| G06K 9/70 | (2006.01) |

(52) U.S. Cl.
CPC .............. *G08G 1/04* (2013.01); *G06K 9/00825* (2013.01); *G06K 9/3233* (2013.01); *G06K 9/70* (2013.01)
USPC .......................................................... 382/103

(58) Field of Classification Search
CPC ......... G08G 1/04; G06K 9/70; G06K 9/3233; G06K 9/00825; G06K 9/3241; G06K 2209/23; G06K 9/00791; G06K 9/00798
USPC .................. 382/103, 104, 106, 107, 108, 199
See application file for complete search history.

(56) References Cited

U.S. PATENT DOCUMENTS

| 8,055,017 B2* | 11/2011 | Saito et al. ..................... 382/103 |
| 8,203,443 B2* | 6/2012 | Bos et al. ....................... 340/461 |
| 2008/0181461 A1* | 7/2008 | Saito et al. ..................... 382/104 |
| 2010/0102990 A1* | 4/2010 | Kamioka ....................... 340/942 |

FOREIGN PATENT DOCUMENTS

| JP | 5-114099 A | 5/1993 |
| JP | 5-265547 A | 10/1993 |
| JP | 6-266828 A | 9/1994 |
| JP | 8-241500 A | 9/1996 |
| JP | 10-283477 A | 10/1998 |
| JP | 3349060 B2 | 11/2002 |
| JP | 2006-72495 A | 3/2006 |
| JP | 2010-224936 A | 10/2010 |

* cited by examiner

*Primary Examiner* — Brian Le
(74) *Attorney, Agent, or Firm* — McDermott Will & Emery LLP

(57) ABSTRACT

A vehicle detection apparatus includes a lamp candidate extraction unit that extracts a pixel region that may correspond to a tail lamp of a vehicle from pixel regions that an integration processing unit creates by extracting and integrating pixels of an image as a lamp candidate and a grouping unit that regroups groups containing the lamp candidate of the groups generated by grouping position data detected by a position detection unit and then regroups all groups. In the regrouping processing, a threshold used for regrouping groups containing the lamp candidate is set easier for regrouping than a threshold used for subsequently regrouping all groups.

19 Claims, 23 Drawing Sheets

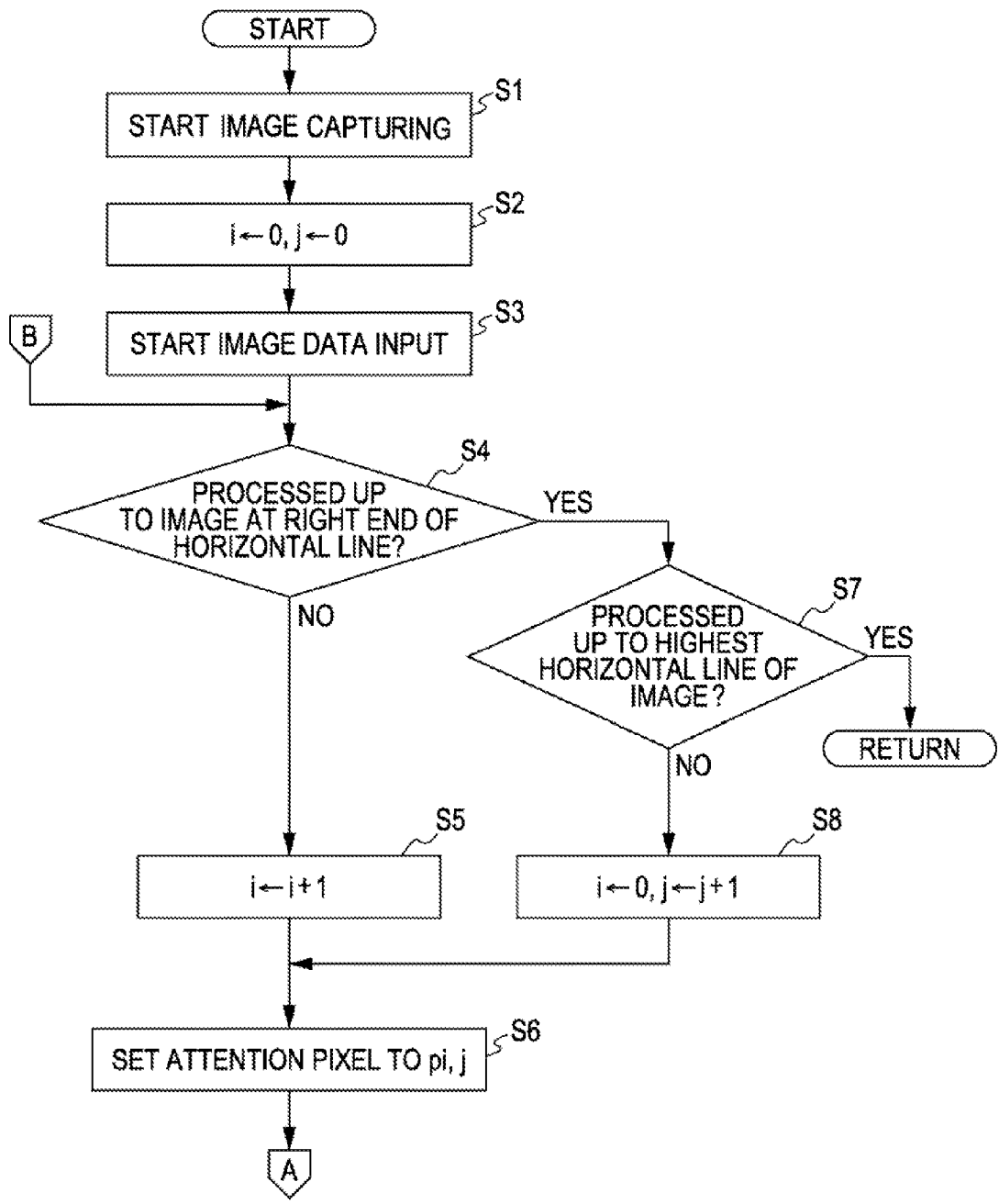

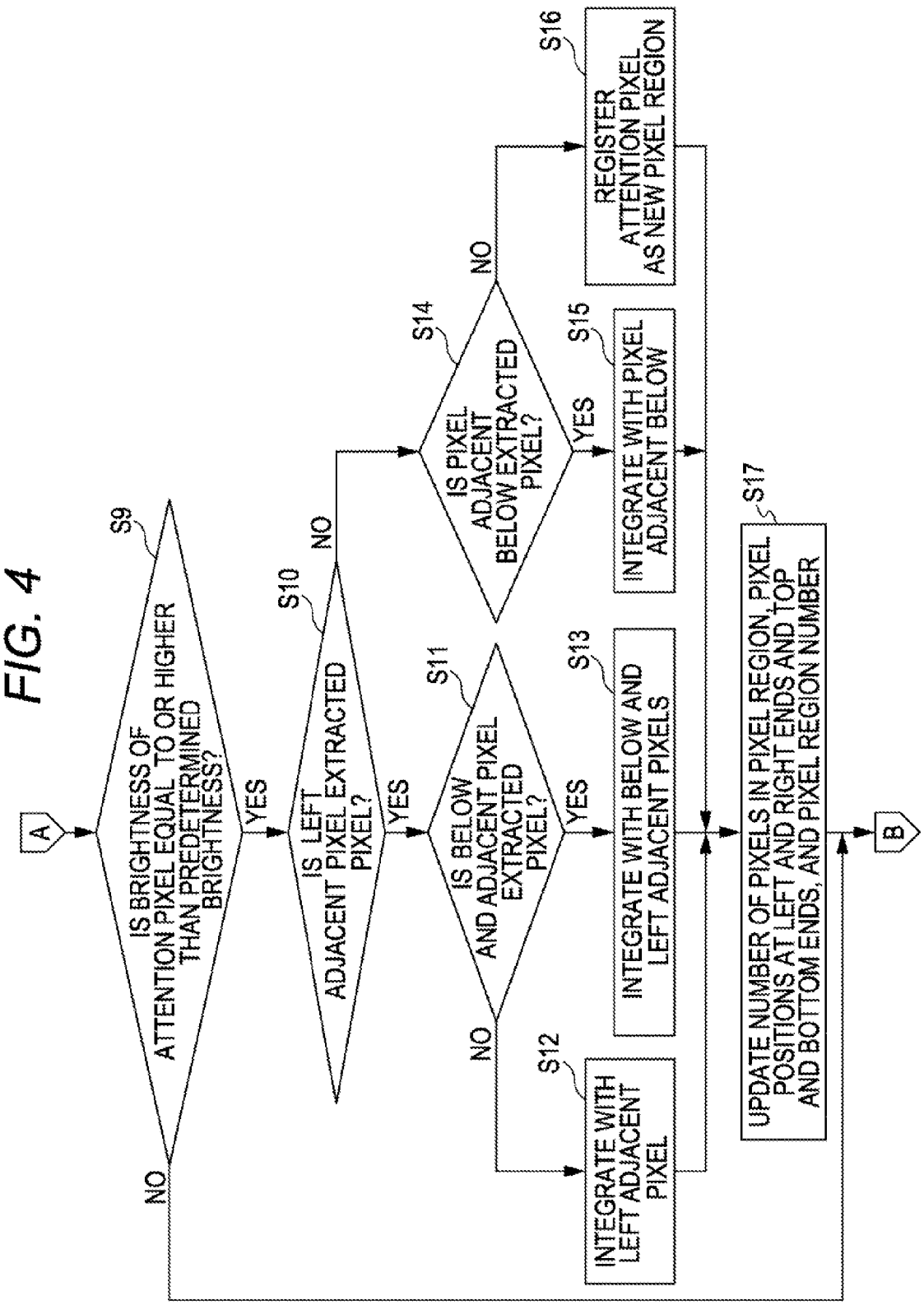

SEGMENT Dn

VEHICLE DETECTION APPARATUS

CROSS-REFERENCE TO RELATED APPLICATIONS

The present application claims priority from Japanese Patent Application No. 2011-030547 filed on Feb. 16, 2011, the entire contents of which are hereby incorporated by reference.

BACKGROUND OF THE INVENTION

1. Field of the Invention

The present invention relates to vehicle detection apparatuses, and in particular, relates to a vehicle detection apparatus that detects a vehicle such as a leading vehicle based on position data obtained by a position detection unit.

2. Description of Related Art

In recent these, vehicle detection apparatuses that detect, for example, vehicles around a vehicle on which an imaging unit such as a CCD (Charge Coupled Device) camera and a CMOS (Complementary Metal Oxide Semiconductor) camera or a radar apparatus is mounted by image analysis of an image captured by the image unit or reflected wave analysis of a radio wave or laser beam emitted by the radar apparatus are under development (see, for example, Japanese Patent No. 3349060).

As a method of detecting an object including a vehicle, for example, images therearound are captured simultaneously by a pair of imaging units such as cameras and stereo matching processing or the like is performed on a pair of obtained images to calculate the distance to an object by calculating information of a parallax for each pixel. For another example, a radio wave is radiated from a radar apparatus, and a reflected wave thereof is analyzed to detect the distance to an object. Based on information of the obtained distance or the like, the object can be detected in the real space by determining the position of the object in the real space.

For example, according to the method described in Japanese Patent No. 3349060, in a scene in which, for example, an image T as shown in FIG. 18 is captured, parallax information is obtained for each pixel block of the image T by performing stereo matching processing on a pair of images including the captured image T. If the parallax information or distance information calculated therefrom is allocated to each pixel block, as shown in FIG. 19, the parallax or distance information can be represented like an image. Hereinafter, the parallax or distance information represented like an image is called a distance image Tz.

Data like an image similar to the distance image Tz shown in FIG. 19 is obtained when the distance is detected by analyzing a reflected wave of a radio wave radiated from a radar apparatus and data of the distance applied in the direction in which the distance is detected to represent the data like an image. Hereinafter, the distance image Tz includes an image obtained by representing data of a distance detected by using a radar apparatus like an image.

Then, the distance image Tz obtained in this manner is divided into, for example, segments Dn in a thin rectangular shape extending in the vertical direction with a predetermined pixel width as shown in FIG. 20 to create a histogram Hn as shown in FIG. 21 for each segment Dn for polling about information of a parallax dp and a distance Z belonging to the segment Dn. Then, for example, the class value of a class to which the mode belongs in the histogram Hn is set as a representative parallax dpn or a representative distance Zn of an object in the segment Dn. The above process is repeated for all segments Dn to calculate the representative parallax dpn or the representative distance Zn for each segment Dn.

The parallax dp and the distance Z are associated as shown below in an image analysis using a pair of imaging units such as cameras. When a point on a reference plane such as the ground directly below the center of the pair of imaging units is set as an origin, the distance direction, that is, the direction toward a point at infinity on the front side of the imaging units is set as the Z axis, and the left and right direction and the up and down direction are set as the X axis and the Y axis respectively, a point (X, Y, Z) in the real space and coordinate (i, j) of a pixel of the above parallax dp on the distance image Tz are associated in a one-to-one relationship by coordinate conversions represented as follows based on the principle of triangulation:

$$X = CD/2 + Z \times PW \times (I-IV) \qquad (1)$$

$$Y = CH + Z \times PW \times (j-JV) \qquad (2)$$

$$Z = CD/(PW \times (dp-DP)) \qquad (3)$$

where, CD is an interval between a pair of imaging units, PW is a viewing angle per pixel, CH is a mounting height of the pair of imaging units, IV and JV are an i coordinate and a j coordinate of a point at infinity on the distance image Tz on the front side respectively, and DP is a vanishing point parallax. The representative parallax dpn is associated with the representative distance Zn in a one-to-one relationship based on the above Formula (3).

Dividing the distance image Tz into segments Dn in a thin rectangular shape extending in the vertical direction as described above, corresponds, in terms of the real space to dividing an imaging region R in the real space by an imaging unit A mounted on a subject vehicle into a plurality of segmented spaces Sn extending in the up and down direction, as shown in a plan view of FIG. 22.

This also applies to a radar apparatus. Specifically, if the imaging unit A is considered as a radar apparatus and the region R is considered as a radiation region of a radio wave in the real space by the radar apparatus in FIG. 22, dividing the distance image Tz into segments Dn in a thin rectangular shape extending in the vertical direction corresponds to dividing the radiation region R in the real space by the radar apparatus A into the plurality of segmented spaces Sn extending in the up and down direction.

Then, if the representative distance Zn (the representative distance Zn associated with the calculated representative parallax dpn in a one-to-one relationship) in the segment Dn of the distance image Tz corresponding to the segmented space Sn is plotted in each segmented space Sn in the real space, each representative distance Zn is plotted, for example, as shown in FIG. 23. In actuality, many points equal to or more than that shown FIG. 23 are plotted finely depending on the number of segments Dn.

Then, as shown in FIG. 24, for example, mutually adjacent plotted representative distances Tn are grouped into groups G1, G2, G3, . . . based on the distance therebetween or directional properties (that is, whether to extend in the left and right direction (that is, the X direction) or the distance direction (that is, the Z direction)). Then, as shown in FIG. 25, an object can be detected by linearly approximating each point belonging to each group.

If, for example, a group O extending substantially in the left and right direction and a group S extending substantially in the distance direction share a corner point C, detected objects are integrated or separated by assuming that both groups belong to a same object.

When, for example, objects are detected by performing image analysis of an image captured by an imaging unit, a detection result can be visualized on the image T by, as shown in FIG. 26, surrounding each object detected based on the distance image Tz as described above by rectangular closing lines on the original image T captured by the imaging unit. In this manner, each object including a vehicle can be detected.

Furthermore, Japanese Patent Application Laid-Open No. H8-241500 proposes, as a method to avoid erroneously detecting two vehicles close to each other as one vehicle, a method of recognizing a front vehicle without using parallax or distance information but using a spatial relationship of a turn signal lamp and a stop lamp after finding a region corresponding to the turn signal lamp and stop lamp in the image because the turn signal lamp position and the stop lamp position on the rear part of a vehicle are almost equally spaced regardless of the vehicle.

However, if the method described in Japanese Patent No. 3349060 (FIGS. 18 to 26) is adopted, in a scene, for example, in which an image T as shown in FIG. 27, is captured, it is desired that a leading vehicle Vah should be detected alone as shown, for example, in FIG. 28A. However, because the leading vehicle Vah and a hedge H are captured adjacent to each other, the leading vehicle Vah and the hedge H may be put together as a group and detected as one object as shown in FIG. 28B.

For another example, in a scene in which an image T as shown in FIG. 29, is captured, effective parallax or distance information is more likely to be detected in left and right edge portions (encircled with alternate long and shorted dashed lines in FIG. 29) of a rear gate B portion of a load-carrying platform P of a flat-bodied truck with a platform, which is a leading vehicle Vah, a front wall F (also referred to as a front structure or guard frame), and a portion corresponding to a rear portion of a cab Ca (encircled with alternate long and shorted dashed lines in FIG. 29). However, almost no effective parallax or distance information is detected in a portion corresponding to the center of the rear gate B of the load-carrying platform P where the surface is flat and lacking in structure (also called texture).

Thus, if, as described above, the distance image Tz is divided into each segment Dn in a thin rectangular shape and groups are formed by calculating the representative parallax dpn and the representative distance Zn for each segment Dn, the left edge portion and the right edge portion of the rear gate B portion of the load-carrying platform P of the leading vehicle Vah may not be put together as a group as shown in FIG. 30, so that these edges are detected as separate objects away from the subject vehicle by a distance of Zb, and the front wall F and cab Ca may be detected as still another object away from the subject vehicle by a distance of Zf.

In a scene in which, for example, an image T as shown in FIG. 31, which looks like a combination of FIGS. 27 and 29, is captured, as shown in FIGS. 31 and 32, the left edge portion of the rear gate B of the load-carrying platform P of the leading vehicle Vah and the right edge portion cannot be put together as a group. Instead, the left edge portion is detected by being integrated with the hedge H.

Therefore, although the scene has the leading vehicle Vah and the hedge H captured therein, the hedge H, the front wall F and the cab Ca, and the right edge portion of the rear gate B of the load-carrying platform P may be detected as separate objects.

On the other hand, if the method described in Japanese Patent Application Laid-Open No. H8-241500 is adopted, when the subject vehicle is traveling on a multi-lane road and, for example, a vehicle of the same type as the leading vehicle Vah is traveling on the right adjacent lane, though not illustrated, the turn signal lamp and stop lamp on the right side of the leading vehicle Vah and the turn signal lamp and stop lamp on the left side of the vehicle traveling on the right lane may be detected as left and right turn signal lamps and stop lamps of one vehicle, causing a problem of reliability of detection.

Therefore, if the same object is detected as separate objects, or separate objects (or a region where there is actually no object) are detected as one object, control will be exercised based on erroneous object information, thereby increasing the danger of accidents contrariwise in automatic control of a vehicle that is supposed to contribute to safe traveling.

Hereinafter, information about the position of an object including the distance to the object obtained, as described above, based on images obtained by a pair of imaging units such as cameras or obtained by a radar apparatus is called position data.

SUMMARY OF THE INVENTION

The present invention has been developed in view of the above circumstances and an object thereof is to provide a vehicle detection apparatus capable of accurately detecting a vehicle such as a leading vehicle by accurately grouping position data of detected objects.

To solve the above problems, a first aspect of the invention provides a vehicle detection apparatus including: a position detection unit that detects position data including a distance of each pixel in an image captured by an imaging unit; an integration processing unit that extracts pixels having a brightness equal to or higher than a predetermined brightness on the image and, if the extracted pixels are adjacent to each other on the image, integrates the pixels as a same pixel region; a lamp candidate extraction unit that extracts the pixel region that may correspond to a tail lamp of a vehicle from among the pixel regions integrated by the integration processing unit as a lamp candidate based on the position data detected by the position detection unit; and a grouping unit that groups position data detected by the position detection unit, determines whether or not to regroup the generated groups containing the position data belonging to the lamp candidate extracted by the lamp candidate extraction unit, after regrouping the groups determined to be capable of being regrouped, determines whether or not to regroup all the groups, and then regroups the groups determined to be capable of being regrouped. Upon regrouping processing by the grouping unit, thresholds about the position data used for the regrouping of the groups containing the position data belonging to the lamp candidate are set easier for the regrouping than thresholds about the position data for the subsequent regrouping of all the groups.

According to a second aspect of the present invention, if, as a result of the regrouping, the generated group is a group containing the position data belonging to the lamp candidate extracted by the lamp candidate extraction unit, the grouping unit identifies the group as a group corresponding to a rear portion of the vehicle.

According to a third aspect of the present invention, the vehicle detection apparatus further includes: a lamp pair candidate extraction unit that extracts a combination of lamp candidates that may correspond to the tail lamps including left and right tail lamps of the vehicle as a lamp pair candidate from the lamp candidates extracted by the lamp candidate extraction unit based on the position data detected by the position detection unit. If the position data belonging to the lamp pair candidate extracted by the lamp pair candidate extraction unit are contained in the group generated by grouping the position data, the grouping unit separates the position data into the position data belonging to the lamp candidates constituting the lamp pair candidate and the position data that does not belong to the lamp candidates so as to perform regrouping processing as the separate groups.

According to a fourth aspect of the present invention, the lamp pair candidate extraction unit selects any of two lamp candidates from among the lamp candidates extracted by the lamp candidate extraction unit, extracts a combination of the two lamp candidates as the lamp pair candidate if a ratio of a number of pixels of one lamp candidate to the number of pixels of the other lamp candidate is within a predetermined range, if a difference in the number of pixels in the vertical direction in the image between the two lamp candidates is within a predetermined range, if a distance and a height of the one lamp candidate in a real space are within predetermined ranges from a distance and a height of the other lamp candidates in the real space, or if an interval between the two lamp candidates in a left and right direction in the real space is within a width corresponding to one vehicle. The extraction processing is performed for all combinations of the lamp candidates extracted by the lamp candidate extraction unit.

According to a fifth aspect of the present invention, if there is another one of the lamp candidate positioned between and above left and right lamp candidates which are the extracted lamp pair candidate in the image, the lamp pair candidate extraction unit adds the another lamp candidate to the lamp pair candidate as a high-mounted stop lamp.

According to a sixth aspect of the present invention, if the lamp candidate added as the high-mounted stop lamp belongs to another lamp pair candidate other than the lamp pair candidate to which the lamp candidate has been added, the lamp pair candidate extraction unit excludes the added lamp candidate from the lamp pair candidate to which the lamp candidate has been added and also cancels the designation of the another lamp pair candidate to which the lamp candidate whose addition is excluded belongs as the lamp pair candidate.

According to a seventh aspect of the present invention, the lamp candidate extraction unit extracts the pixel regions whose height from a road surface is within a predetermined range as the lamp candidates from among the pixel regions integrated by the integration processing unit.

According to an eighth aspect of the present invention, the vehicle detection apparatus further includes a distance image creation unit that creates a distance image by allocating the position data detected by the position detection unit to a corresponding pixel of the image captured by the imaging unit. The grouping unit divides the distance image created by the distance image creation unit into a plurality of segments, and creates a histogram for each of the segments. If there is the lamp candidate extracted by the lamp candidate extraction unit in the segment, the grouping unit calculates a representative distance of the segment by polling distance information in the position data allocated to each pixel in the lamp candidate for the histogram. If there is no lamp candidate extracted by the lamp candidate extraction unit in the segment, the grouping unit calculates a representative distance of the segment by polling distance information in the position data allocated to each pixel in the segment for the histogram. Then the grouping unit selects the position data containing the calculated representative distances for the grouping.

According to a ninth aspect of the present invention, in the case where the representative distance of the segment is calculated by polling the distance information in the position data allocated to each pixel in the segment for the histogram when there is no lamp candidate extracted by the lamp candidate extraction unit in the segment, the grouping unit invalidates the calculated representative distance for the segment in which a frequency of a class of the histogram corresponding to the calculated representative distance is less than a predetermined value and perform the grouping by assuming that there is no representative distance in the segment.

According to the first aspect of the present invention, groups that do not contain position data of a lamp candidate are excluded, and it is first determined whether or not to regroup the lamp candidates corresponding to a tail lamp TL such as a turn signal lamp and a stop lamp of a vehicle. Then regrouping processing is performed by using thresholds easier for regrouping, and then it is determined whether or not to regroup with other groups. Therefore, groups corresponding to the vehicle can be detected based on groups corresponding to the left and right tail lamps TL of the vehicle, and vehicles including the leading vehicle can be accurately detected by accurately grouping the position data detected by the position detection unit.

According to the second aspect of the present invention, if, as a result of regrouping, the generated group is a group containing position data belonging to a lamp candidate corresponding the tail lamp TL of the vehicle, it is highly probable that the group corresponds to the vehicle provided with the tail lamp TL. Therefore, by identifying such a group as a group corresponding to a rear portion of the vehicle, the vehicle can be accurately detected, thereby exhibiting advantages of the first aspect of the present invention more steadily.

When the grouping unit generates groups by grouping position data, one thus-generated group may contain position data belonging to a lamp pair candidate corresponding to the left and right tail lamps TL of the vehicle as well as position data that does not belong to the lamp pair candidate. Thus, according to the third aspect of the present invention, in such a case, the position data is forcibly separated into position data belonging to each lamp candidate constituting the lamp pair candidate and position data that does not belong to each lamp candidate to decompose the group into separate groups.

Then, regrouping processing is performed again, whereby the group is accurately separated into a group constituted of position data belonging to the lamp pair candidate corresponding to the left and right tail lamps TL of the vehicle and a group constituted of position data that does not belong to the lamp pair candidate, and then it is determined whether or not to regroup each of groups as a separate group with other groups.

As a result, as exemplified in FIG. 32, a hedge H and a portion of the vehicle can be accurately prevented from being processed as the same group, and the vehicle can be accurately detected while the group constituted of position data belonging to the lamp pair candidate corresponding to the left and right tail lamps TL of the vehicle and the group constituted of position data that does not belong to the lamp pair candidate are accurately separated, thereby exhibiting advantages of the second aspect of the present invention more steadily.

According to the fourth aspect of the present invention, by setting lamp candidates as a lamp pair candidate when one of the above conditions is satisfied, lamp candidates corresponding to the left and right tail lamps TL of the vehicle can be accurately extracted as a lamp pair candidate, thereby exhibiting advantages of the third aspect of the present invention more steadily.

In these years, some vehicles have a high-mounted stop lamp mounted thereon in addition to the left and right tail lamps TL. According to the fifth aspect of the invention, even in such a case, a lamp candidate corresponding to the high-mounted stop lamp can be accurately incorporated into the above lamp pair candidate, whereby lamp candidates corresponding to the left and right tail lamps TL and the high-mounted stop lamp of the vehicle can be accurately extracted as a lamp pair candidate. Therefore, advantages of the third and fourth aspects of the present invention can be exhibited more steadily.

If the lamp candidate which is added as a high-mounted stop lamp as described in the fifth aspect of the invention belongs to a different lamp pair candidate from the lamp pair candidate to which the high-mounted stop lamp is added, an abnormal state arises in which a lamp pair candidate is captured above another lamp pair candidate in an image.

According to the sixth aspect of the present invention, in such a case, by excluding the lamp candidate added as a high-mounted stop lamp from the lamp pair candidate to which the lamp candidate is added, the lamp candidate unlikely to correspond to a high-mounted stop lamp can be prevented accurately from being added to the lamp pair candidate and therefore, thereby exhibiting advantages of the fifth aspect of the present invention more steadily.

A pixel region positioned high above a road surface and a pixel region as high as the road surface may be a pixel region corresponding to a street lamp and a pixel region corresponding to a reflected light on the road surface wet with rain, and both pixel regions cannot be considered to correspond to the tail lamp TL of the vehicle. Thus, according to the seventh aspect of the present invention, by dividing pixel regions depending on whether the height of position data from the road surface is within a predetermined range based on the height of position data from the road surface, pixel regions that may correspond to the tail lamp of the vehicle can be accurately extracted as lamp candidates, thereby exhibiting advantages of the above aspects of the present invention more steadily.

If configured to perform the above processing for all position data detected from a distance image, the number of data points amounts to a huge number so that it takes time for processing and real-time vehicle detection may be lost. Thus, according to the eighth aspect of the present invention, by dividing a distance image into a plurality of segments Dn, calculating a representative distance for each divided segment Dn, and selecting position data containing each calculated representative distance for grouping, the number of data points to be processed can be reduced and therefore, in addition to the advantages of the above aspects of the present invention, real-time vehicle detection can be ensured.

Then, if there is a lamp candidate in the segment Dn, the representative distance calculated only from distance information of each pixel in the lamp candidate can preferentially be calculated as the representative distance of the segment Dn by calculating the representative distance of the segment Dn by ignoring other portions in the segment Dn and polling only distance information allocated to each pixel in the lamp candidate for the histogram.

Therefore, if there is a lamp candidate in the segment Dn, the representative distance of the lamp candidate corresponding to the tail lamp TL of the vehicle, instead of distance information allocated to pixels in a portion other than the lamp candidate in the segment Dn, can be reliably extracted as the representative distance in the segment Dn.

According to the ninth aspect of the invention, when there is no lamp candidate in the segment Dn, by invalidating the calculated representative distance for the segment Dn in which the frequency of a class of a histogram corresponding to the calculated representative distance is smaller than a predetermined value and handling the segment Dn as having no representative distance, reliability of vehicle detection can be prevented from being decreased due to adoption of a representative distance with low reliability, thereby exhibiting advantages of the eighth aspect of the present invention more steadily.

BRIEF DESCRIPTION OF THE DRAWINGS

FIG. 3 is a flow chart showing a processing procedure for integration processing by an integration processing unit;

FIG. 4 is a flow chart showing the processing procedure for the integration processing by the integration processing unit;

DETAILED DESCRIPTION OF THE PREFERRED EMBODIMENTS

Hereinafter, an embodiment of a vehicle detection apparatus according to the present invention will be described with reference to the drawings.

In the present embodiment, two cameras are used as an imaging unit 2 for stereo imaging, but the imaging unit may be configured by a single camera or three or more cameras for example.

Figure 1:
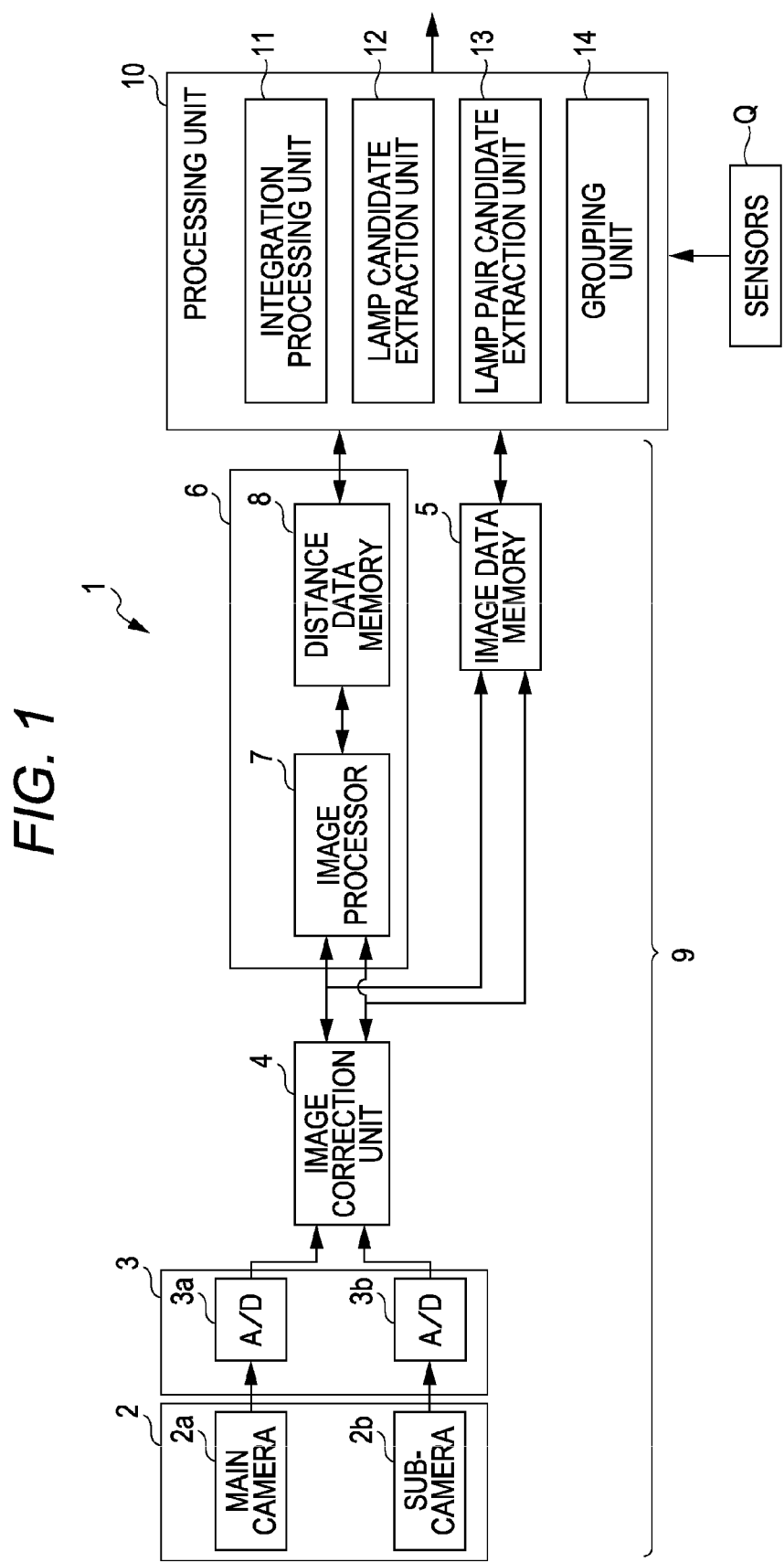
FIG. 1 is a block diagram showing a configuration of a vehicle detection apparatus according to an embodiment of the present invention.

As shown in FIG. 1, A vehicle detection apparatus 1 according to the present embodiment mainly includes a position detection unit 9 composed of the imaging unit 2, a conversion unit 3, an image processing unit 6 and the like and a processing unit 10 including an integration processing unit 11, a lamp candidate extraction unit 12, and the like.

The position detection unit 9 includes the imaging unit 2 for captures an image around a subject vehicle. The imaging unit 2 captures an image of objects around the subject vehicle and also detects position data of the objects corresponding to positions in the real space including distances from the subject vehicle to these objects, heights thereof, positions in the left and right direction.

In the present embodiment, the position detection unit 9 is configured based on a vehicle detection apparatus described in Japanese Patent No. 3349060 filed previously by the present applicant, and also Japanese Patent Application Laid-Open Nos. 115-114099, H5-265547, H6-266828, H10-283477, and 2006-72495. The position detection unit 9 will be briefly described below.

As shown in FIG. 1, the position detection unit 9 converts a pair of captured images obtained by capturing a surrounding of the subject vehicle by the imaging unit 2 into digital images by the conversion unit 3. The imaging unit 2 includes a pair of a main camera 2a and a sub-camera 2b that are disposed with a predetermined interval therebetween in the vehicle width direction (that is, the left and right direction) and are configured by a CCD camera. The conversion unit 3 includes A/D converters 3a and 3b. Then the position detection unit 9 makes an image correction such as removal of shifts or noise and a brightness correction using an image correction unit 4 to store the resultant digital images in an image data memory 5 and also to send them to the processing unit 10.

Figure 18:
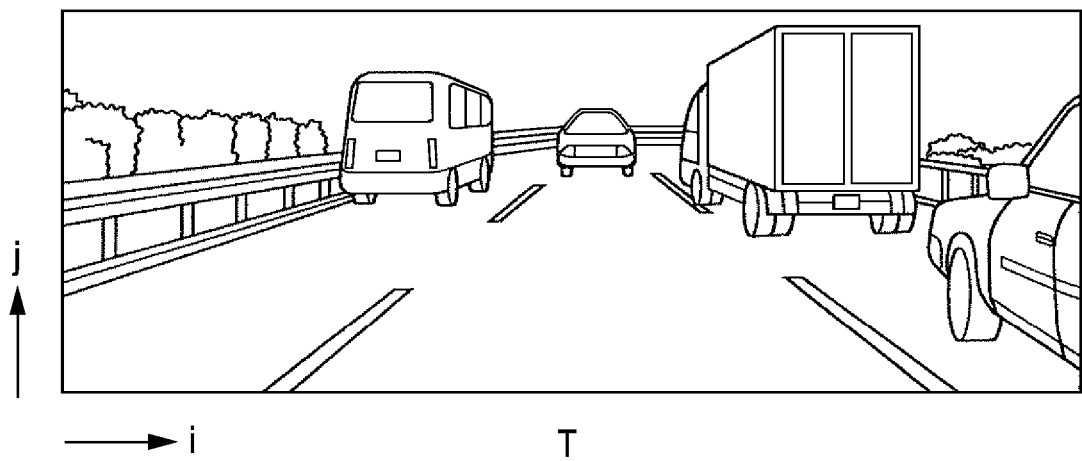
FIG. 18 is a diagram showing an example of an image captured by an imaging unit.

For example, the above-described image T (hereinafter referred to as a reference image T) as shown in FIG. 18 and the like is captured by the main camera 2a of the imaging unit 2 and an unillustrated image (hereinafter referred to as a comparative image) captured by the sub-camera 2b. The comparative image looks like the reference image T and is captured from a position apart from the main camera 2a in the vehicle width direction by a predetermined distance.

In the present embodiment, the main camera 2a and the sub-camera 2b of the imaging unit 2 obtain a monochrome brightness D, but an imaging unit that obtains color image data represented by an RGB value or the like can be used, and the present invention is also applied to this case.

Figure 2:
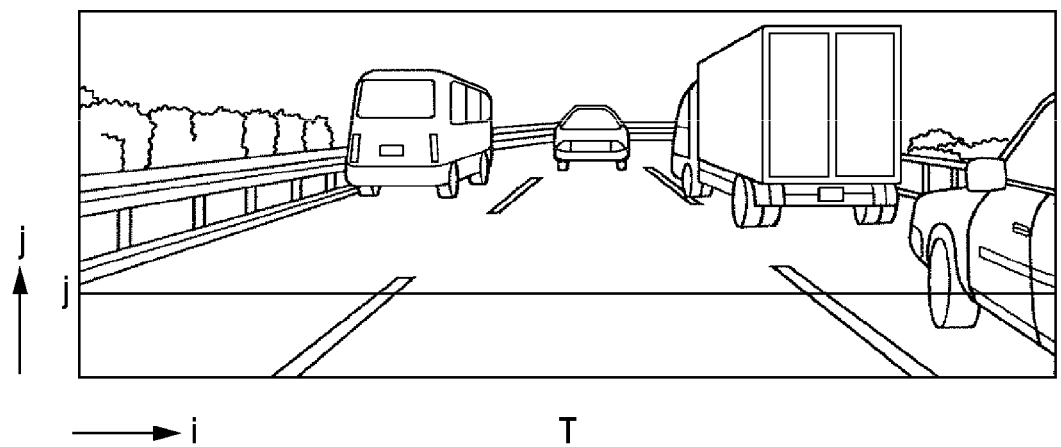
FIG. 2 is a diagram illustrating a horizontal line in a reference image.

Further, in the present embodiment, when the reference image T and the comparative image are captured by the main camera 2a and the sub-camera 2b of the imaging unit 2, as shown in FIG. 2, image capturing is started with a leftmost pixel of each horizontal line j of the reference image T or the like and then pixels are sequentially scanned in the right direction. In addition, image capturing is performed by switching the horizontal line j to be scanned from the lowest line to sequentially upward so as to send the brightness D of the pixels of the reference image T and a comparative image Tc in the order of capturing to the conversion unit 3.

The pair of the captured images corrected by the image correction unit 4 is also sent to the image processing unit 6. An image processor 7 of the image processing unit 6 divides the reference image T captured by the main camera 2a into a plurality of pixel blocks, and a corresponding pixel block in the comparative image captured by the sub-camera 2b is determined for each pixel block by stereo matching processing. Then the parallax dp for each pixel block is calculated as described above.

The method of calculating the parallax dp is described in detail in each of the above gazettes. As described above, the parallax dp and coordinates (i, j) of a pixel block on the reference image T are associated with a point (X, Y, Z) in the real space in a one-to-one relationship by aforementioned Formulas (1) to (3). The present embodiment uses data (i, j, dp) composed of the parallax dp and the coordinates (i, j) as position data, but, for example, a position (X, Y, Z) in the real space calculated by substituting the data (i, j, dp) into aforementioned Formulas (1) to (3) may be used as position data.

The image processing unit 6 creates the aforementioned distance image Tz (see, for example, FIG. 19) by, as described above, allocating the parallax dp calculated for each pixel block to each corresponding pixel of the reference image T and stores the created distance image Tz in a distance data memory 8 and also sends the distance image Tz to the processing unit 10.

Figure 19:
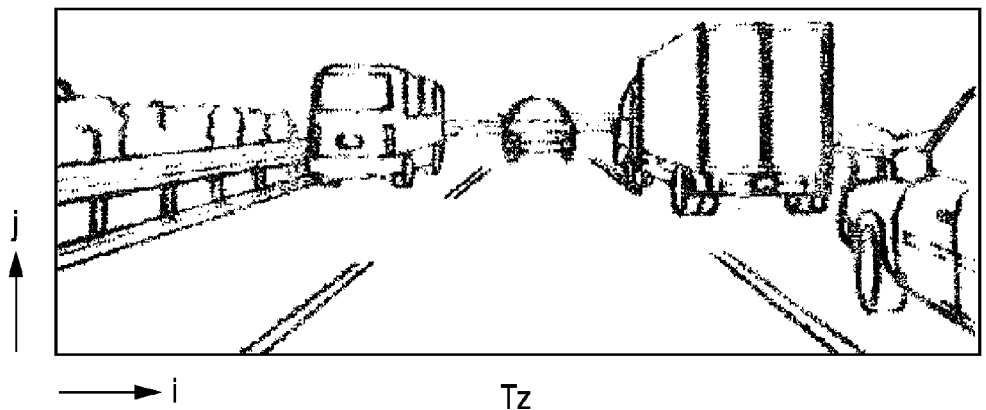
FIG. 19 is a diagram showing a distance image created based on the image in FIG. 18.

Thus, in the present embodiment, the image processing unit 6 corresponds to a distance image creation unit. The distance image Tz has the parallax dp as distance information, as well as, information of coordinates (i, j) as shown in FIG. 19. Thus, the distance image Tz corresponds to the reference image T to which the position data (i, j, dp) containing the parallax dp detected by the position detection unit 9 is allocated.

In addition to the present embodiment, though not illustrated, the measurement of position data containing a distance Z (or the parallax dp) of each vehicle with respect to the subject vehicle may be performed by a radar apparatus that radiates a laser light L, infrared rays or the like radiated in a forward direction of the subject vehicle and measures the distance Z to an object or the position (X, Y, Z) of the object in the real space based on, for example, information of a reflected light of the laser light L, infrared rays or the like. In such a case, the radar apparatus serves as the distance detection unit 9. Thus, the configuration of the distance detection unit 9 that detects distance data is not limited to a specific configuration.

However, the vehicle detection apparatus 1 is configured to include the imaging unit 2 even when a radar apparatus is used as the distance detection unit 9. In this case, the imaging unit 2 may be configured with a single camera. In such a case, the image processing unit 6 serving as a distance image creation unit is configured to create the distance image Tz by allocating position data detected by the radar apparatus serving as the distance detection unit 9 to each pixel in an image captured by the imaging unit 2.

In the present embodiment, the processing unit 10 is includes a dedicated circuit or a computer in which a CPU (central processing unit), ROM (read only memory), RAM (random access memory), input/output interface and the like (not shown) are connected to a bus. The processing unit 10 includes the integration processing unit 11, the lamp candidate extraction unit 12, a lamp pair candidate extraction unit 13, and a grouping unit 14. In the present embodiment, the processing unit 10 further includes an unillustrated memory.

The processing unit 10 may be configured to perform other processing such as leading vehicle detection. If necessary, measured values from sensors Q such as a speed sensor, a yaw rate sensor, and a steering angle sensor that measures a steering angle of a steering wheel are input into the processing unit 10.

Hereinafter, processing performed in each unit of the processing unit 10 will be described as well as workings of the vehicle detection apparatus 1 according to the present embodiment.

The integration processing unit 11 extracts pixels having a brightness equal to or higher than a predetermined brightness that corresponds to a brightness of a tail lamp TL such as a turn signal lamp and stop lamp of a vehicle such as the leading vehicle Vah on the reference image T captured by the main camera 2a of the imaging unit 2. If extracted pixels are adjacent to each other on the reference image T, the integration processing unit 11 integrates these pixels as a same pixel region. The comparative image described above is not used for integration processing in the integration processing unit 11.

The integration processing performed by the integration processing unit 11 will be specifically described below using a flow chart shown in FIGS. 3 and 4.

Hereinafter, a pixel in the reference image T as shown, for example, in FIG. 2 is denoted as a pixel pi,j by using coordinates (i, j) of the pixel when a pixel at the lower left corner of the reference image T is set as an origin and an axis is set in the right direction and a j axis is set in the upward direction. The brightness D of the pixel pi,j is denoted as Di,j.

When the imaging unit 2 starts image capturing (step S1), the integration processing unit 11 sets values of i and j to 0 (step S2). When, as described above, the processing unit 10 starts receiving a brightness D0,0 of a pixel p0,0 (that is, pixel at the origin) at the left end of the horizontal line 0 (that is, horizontal line j composed of pixels having a j coordinate of 0) captured by the imaging unit 2 (step S3), subsequently brightnesses D1,0, D2,0, D3,0, . . . of pixels p1,0, p2,0, p3,0, . . . are sequentially input to the processing unit 10.

If the processing is not completed up to the pixel at the right end of the horizontal line j (step S4; NO), the integration processing unit 11 increments the i coordinate by 1 each time the processing is repeated (step S5) to continue the processing by moving a set attention pixel pi,j to the right adjacent pixel on the horizontal line j (step S6).

When the processing of the pixel at the right end of the horizontal line j is completed (step S4; YES), if the processing of the highest horizontal line j of the reference image T is not completed (step S7; NO), the integration processing unit 11 moves the horizontal line j to be processed upward by one line to the horizontal line j+1, sets the i coordinate of the attention pixel to 0 (step S8), and performs the processing by setting the pixel p0,j+1 as the attention pixel (step S6) to continue the processing by moving the attention pixel sequentially from the pixel p0,j+1 to the right.

Next, the processing (step S9 and thereafter in FIG. 4) performed by the integration processing unit 11 after the attention pixel is set to the pixel pi,j (step S6) will be described.

The integration processing unit 11 first determines whether or not the attention pixel pi,j is a pixel having a brightness equal to or higher than a predetermined brightness Dth (step S9). If the brightness D of the attention pixel pi,j is equal to or higher than the predetermined brightness Dth (step S9; YES), the integration processing unit 11 extracts the attention pixel pi,j.

In this case, the predetermined brightness Dth is set to a brightness that allows the tail lamp TL such as a turn signal lamp and a stop lamp of a vehicle such as the leading vehicle Vah to be detected. Specifically, if the brightness D falls in a range of, for example, 0 to 255, the predetermined brightness Dth is set to, for example, 240.

Hereinafter, the pixel extracted as described above will be referred to as an extracted pixel. If the brightness D of the attention pixel pi,j is lower than the predetermined brightness Dth (step S9; NO), the integration processing unit 11 proceeds to step S4 in FIG. 3.

If the integration processing unit 11 determines that the brightness D of the attention pixel pi,j is equal to or higher than the predetermined brightness Dth and extracts the attention pixel pi,j (step S9; YES), the integration processing unit 11 proceeds to determination processing in step S10. Then, the integration processing unit 11 determines whether or not the pixel pi−1,j which is adjacent to the attention pixel pi,j on the left as shown in FIG. 5A, and has been input and subjected to the determination processing in step S9 before the attention pixel pi,j is input is an extracted pixel (step S10).

Figure 6A:
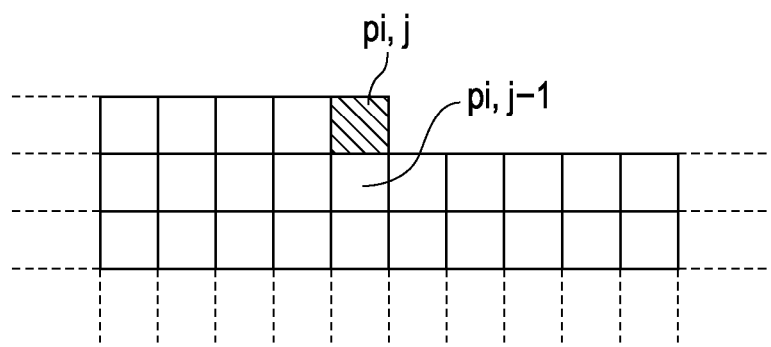
FIG. 6A is a diagram illustrating an input attention pixel and a pixel below and adjacent to the attention pixel.

If the pixel pi−1,j adjacent to the attention pixel pi,j on the left is an extracted pixel (step S10; YES), the integration processing unit 11 subsequently proceeds to determination processing in step S11 and determines whether or not the pixel pi,j−1 that is positioned below and adjacent to the attention pixel pi,j as shown in FIG. 6A and has been input and subjected to the determination processing in step S9 before the attention pixel pi,j is input is an extracted pixel (step S11).

Then, if the pixel pi,j−1 below and adjacent to the attention pixel pi,j is not an extracted pixel (step S11; NO), the integration processing unit 11 integrates the attention pixel pi,j and the pixel i−1,j adjacent thereto on the left into one pixel region g because the determination processing in step S10 has determined that the pixel pi−1,j adjacent to the attention pixel pi,j on the left is an extracted pixel (step S12).

Figure 5A:
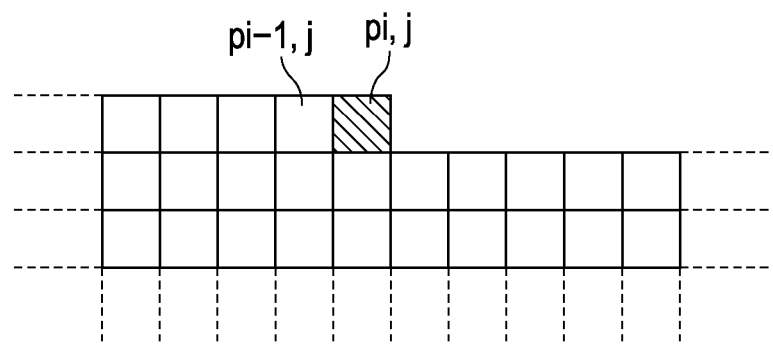
FIG. 5A is a diagram illustrating an input attention pixel and a pixel adjacent thereto on the left.
Figure 5B:
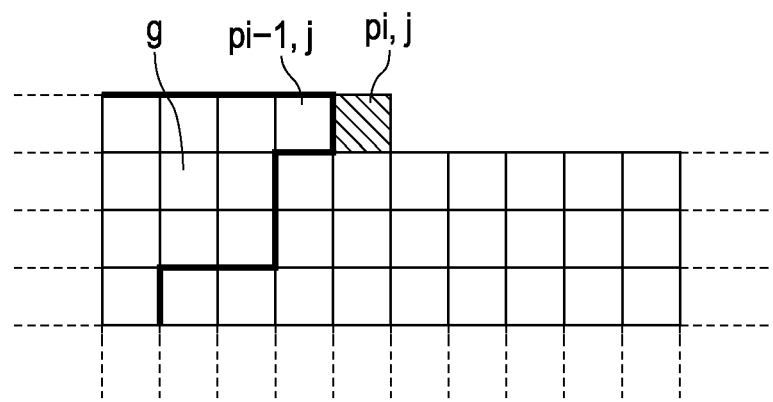
FIG. 5B is a diagram illustrating an example in which the pixel adjacent to the attention pixel on the left belongs to a pixel region.

If, as shown in FIG. 5A, the left adjacent pixel pi−1,j is not integrated with any other pixel, the attention pixel pi,j and the left adjacent pixel pi−1,j are integrated to newly form a pixel region g composed of two pixels adjacent to each other in the left and right direction. If, as shown, for example, in FIG. 5B, the left adjacent pixel pi−1,j already belongs to a pixel region g, the attention pixel pi,j is integrated so that the attention pixel pi,j is added to the pixel region g, which is extended by one pixel for the attention pixel pi,j.

If the pixel pi,j−1 below and adjacent to the attention pixel pi,j is an extracted pixel in the determination processing in step S11 (step S11; YES), the integration processing unit 11 integrates the attention pixel pi,j with the below adjacent pixel pi,j−1 and the left adjacent pixel pi−1,j because the determination processing in step S10 has determined that the pixel pi−1,j adjacent to the attention pixel pi,j on the left is also an extracted pixel (step S13).

Then, if each of the below adjacent pixel pi,j−1 and the left adjacent pixel pi−1,j is not integrated with any other pixel, the attention pixel pi,j, the below adjacent pixel pi,j−1 and the left adjacent pi−1,j to are integrated to newly form a pixel region g composed of three pixels.

Figure 7A:
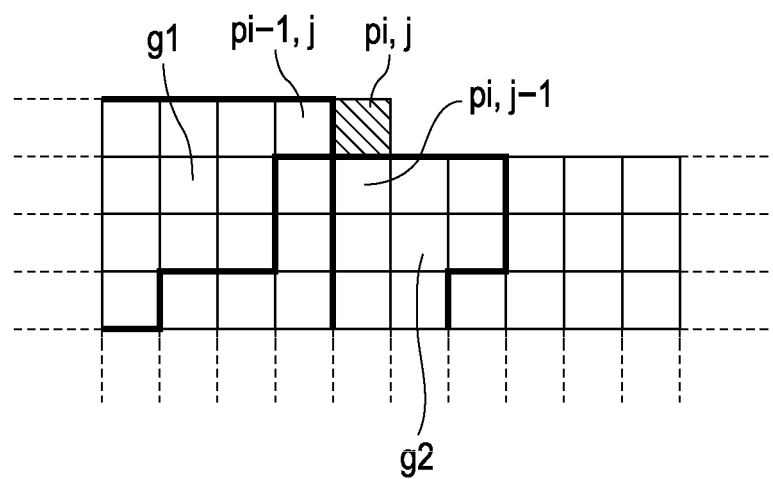
FIG. 7A is a diagram illustrating an example of groups to which the pixel adjacent to the attention pixel on the left and the pixel below and adjacent to the attention pixel belong.
Figure 7B:
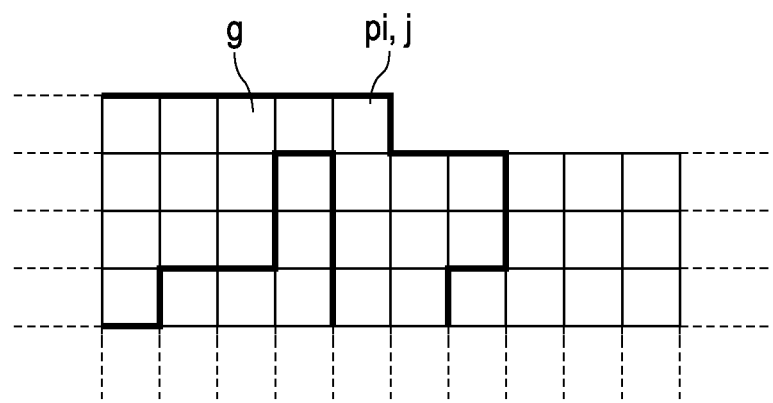
FIG. 7B is a diagram illustrating an example in which groups are formed into one group after the groups are integrated with one pixel.

In the case where, as shown, for example, in FIG. 7A, the pixel left adjacent pi−1,j belongs to a pixel region g1 and the below adjacent pixel pi,j−1 belongs to another pixel region g2, the attention pixel pi,j is integrated with the below adjacent pixel pi,j−1 and the left adjacent pixel pi−1,j (step S13). Then, as shown in FIG. 7B, the pixel region g1 and the pixel region g2 are integrated into one pixel region g via the attention pixel pi,j.

On the other hand, in the determination processing in step 10 described above, if the pixel pi−1,j adjacent to the attention pixel pi,j on the left is not an extracted pixel (step S10; NO), the integration processing unit 11 subsequently proceeds to determination processing in step S14 and determines whether or not the pixel pi,j−1 that is positioned below and adjacent to the attention pixel pi,j as shown in FIG. 6A and has been input and subjected to the determination processing in step S9 before the attention pixel pi,j is input is an extracted pixel (step S14).

Then, if the pixel pi,j−1 below and adjacent to the attention pixel pi,j is an extracted pixel (step S14; YES), the integration processing unit 11 integrates the attention pixel pi,j and the below adjacent pixel i−1,j into one pixel region g (step S15).

Figure 6B:
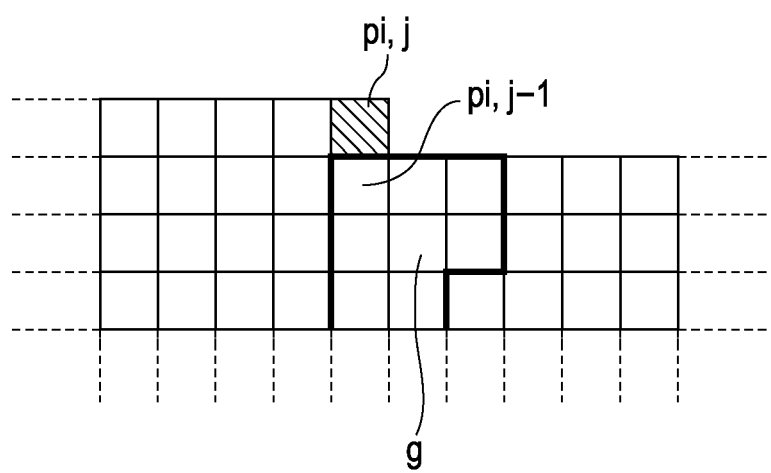
FIG. 6B is a diagram illustrating an example in which the pixel below and adjacent to the attention pixel belongs to a pixel region.

Then, if, as shown in FIG. 6A, the below adjacent pixel pi,j−1 is not integrated with any other pixel, the attention pixel pi,j and the below adjacent pixel pi,j−1 are integrated to newly form a pixel region g that includes two pixels are adjacent to each other in the up and down direction. If, as shown, for example, in FIG. 6B, the below adjacent pixel pi,j−1 already belongs to a pixel region g, the attention pixel pi,j is integrated so that the attention pixel pi,j is added to the pixel region g, which is extended by one pixel for the attention pixel pi,j.

If the pixel pi,j−1 below and adjacent to the attention pixel pi,j is not an extracted pixel in the determination processing in step 14 (step S14; NO), the integration processing unit 11 registers the newly extracted attention pixel pi,j this time as a new pixel region g (step S16).

When the integration processing unit 11 integrates the attention pixel pi,j with an adjacent pixel p by the processing in steps S12, S13 or S15 or newly registers the attention pixel pi,j as a new pixel region g by the processing in step S16, the integration processing unit 11 updates the number of pixels of the pixel region g, and also updates each coordinate of pixels at a left end gleft and a right end gright of the pixel region g, each coordinate of pixels at a top end gtop or a bottom end gbottom, and coordinates (gi, gj) of the center if there is any change therein.

Then, gi of the coordinates (gi, gj) of the center of the pixel region g is calculated as an i coordinate of the intermediate point of the left end gleft and the right end gright of the pixel region g and gj is calculated as a j coordinate of the intermediate point of the top end gtop and the bottom end gbottom of the pixel region g.

If, as shown, for example, in FIG. 7B, a plurality of pixel regions g1 and g2 is integrated into one pixel region g, the pixel region number of the integrated pixel region g is updated by selecting, for example, the smallest number among the region numbers of the plurality of pixel regions g1 and g2 which are integrated (step S17).

Then, when the processing in step s17 is completed, the integration processing unit 11 continues with the processing of the determination processing in step S4 in FIG. 3 and thereafter. When the above processing is finished up to the highest horizontal line j of the reference image T, the integration processing is finished.

The lamp candidate extraction unit 12 (see FIG. 1) extracts the pixel region g that is likely to correspond to the tail lamp TL of a vehicle as a lamp candidate $g_L$ from among the pixel regions g integrated by the integration processing unit 11 as described above, based on position data detected by the position detection unit 9, that is, the distance image Tz created by the image processing unit 6 serving as a distance image creation unit in the present embodiment.

Specifically, while the pixel region g integrated by the integration processing unit 11 on the reference image T is obtained, as described above, by extracting and integrating pixels having the brightness D equal to or higher than the predetermined brightness Dth corresponding to the brightness of the tail lamp TL such as a turn signal lamp and stop lamp of a vehicle such as the leading vehicle Vah, the pixel region g may be a pixel region corresponding to, for example, a street lamp in a high position from a road surface or a pixel region corresponding to, for example, a reflected light on the road surface wet with rain.

Thus, in the present embodiment, the lamp candidate extraction unit 12 determines whether or not a height y from the road surface of each pixel region g integrated by the integration processing unit 11 as described above is within a range of a height y in which there is the tail lamp TL of a vehicle. This range is set to the range of, for example, 10 cm to 3 m from the road surface.

The height y from the road surface of the pixel region g can be calculated as a height Y in the real space by substituting, for example, a top end coordinate gtop or a bottom end coordinate gbottom or the j coordinate gj of the center (see step S17 in FIG. 4) of the pixel region g updated as described above or the parallax dp determined from the distance image Tz corresponding to the reference image T into Formula (3) or Formula (2) described above.

Alternatively, for example, a road detection unit that detects the height of the road surface itself may be provided in the processing unit 10 so that the value obtained by subtracting the height of the road surface itself from the height Y of the real space is set as the height y of the pixel region g from the road surface.

Then, the lamp candidate extraction unit 12 makes the above determination for each pixel region g. If the height y from the road surface of the pixel region g is within the set range, the pixel region g is extracted as a lamp candidate In this manner, the pixel regions g are classified into the lamp candidate $g_L$ and other pixel region g.

The extraction processing of the lamp candidates $g_L$ by the lamp candidate extraction unit 12 may be performed after the integration processing unit 11 has finished integrating all the pixel regions g, as described above, or, alternatively, while the integration processing unit 11 performs the integration processing. Specifically, the lamp candidate extraction unit 12 may be configured to perform the extraction processing each time the integration processing unit 11 integrates the attention pixel pi,j with the pixel region g (see steps S12, S13 and S15 in FIG. 4) or registers the attention pixel pi,j as a new pixel region g (see step S16).

The lamp pair candidate extraction unit 13 (see FIG. 1) extracts a combination of the lamp candidates $g_L$ that are likely to correspond to the left and right tail lamps TL of a vehicle as a lamp pair candidate from the lamp candidates $g_L$ extracted by the lamp candidate extraction unit 12 as described above, based on position data detected by the position detection unit 9, that is, the distance image Tz created by the image processing unit 6 serving as a distance image creation unit in the present embodiment.

In these years, there is a increasing number of vehicles provided with, in addition to the left and right tail lamps TL such as turn signal lamps and stop lamps, a high-mounted stop lamp in an upper part of an intermediate portion of the left and right tail lamps in the left and right direction in a rear portion of the vehicle. If such a high-mounted stop lamp is provided, the lamp pair candidate extraction unit 13 adds also a lamp candidate $g_L$ corresponding to the high-mounted stop lamp to a lamp pair candidate $Pg_L$ that is a combination of the lamp candidates $g_L$ corresponding to the left and right tail lamps TL.

Figure 8:
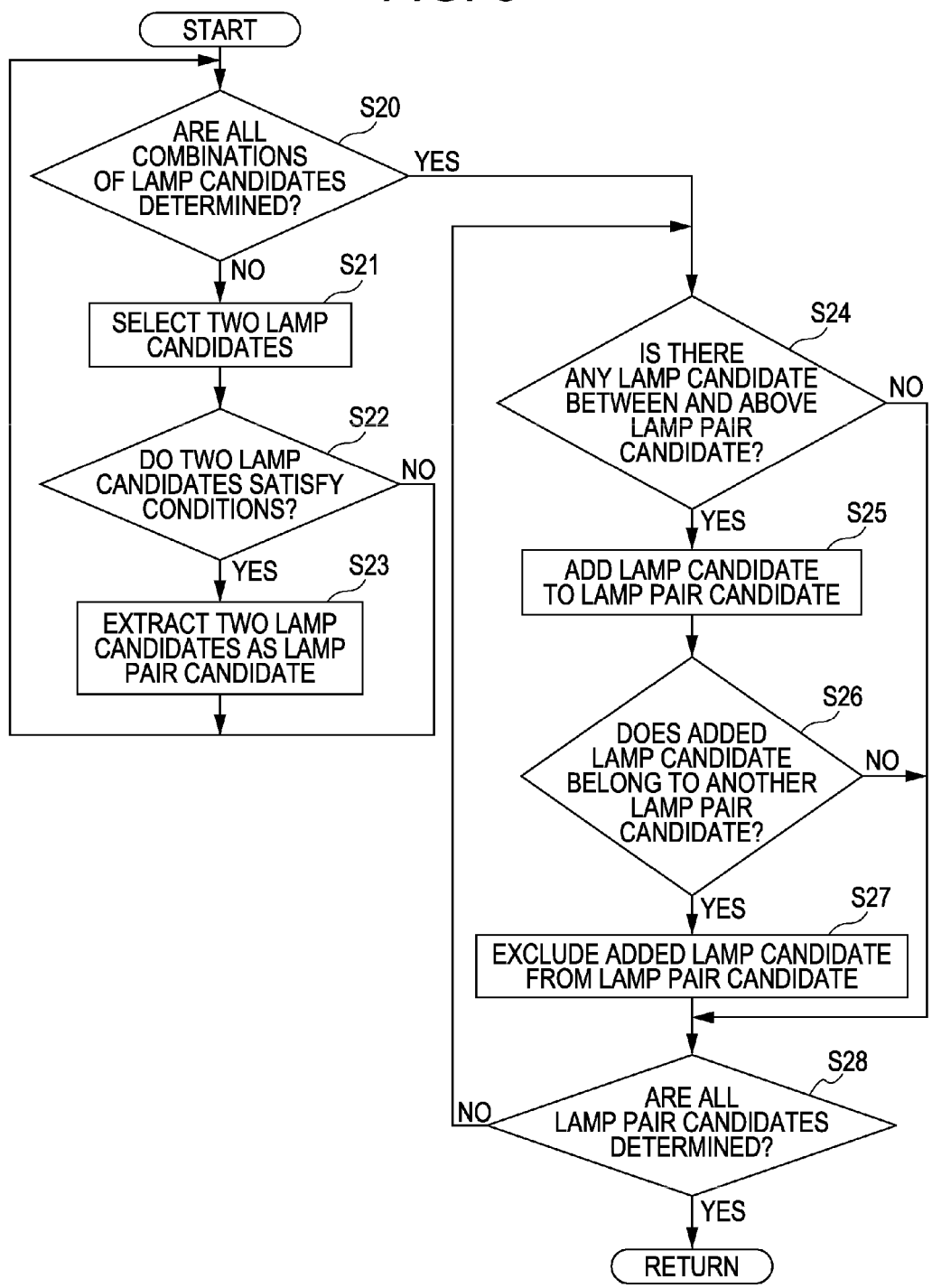
FIG. 8 is a flow chart showing the processing procedure for extracting processing of a lamp pair candidate by a lamp pair candidate extraction unit.

The extraction processing of the lamp pair candidate $Pg_L$ by the lamp pair candidate extraction unit 13 in the present embodiment will be described below using the flow chart shown in FIG. 8.

If the following determination processing is not performed for all combinations of the lamp candidates $g_L$ (step S20; NO), the lamp pair candidate extraction unit 13 selects any of two lamp candidates $g_L$ from among the lamp candidates $g_L$ extracted by the lamp candidate extraction unit 12 (step S21). Then, the lamp pair candidate extraction unit 13 determines whether or not the selected two lamp candidates $g_L$ satisfy conditions for the left and right tail lamps TL of a vehicle (step S22).

More specifically, in the determination processing in step S22, the lamp pair candidate extraction unit 13 determines whether or not a ratio of the number of pixels of one lamp candidate $g_L$ of the selected two lamp candidates $g_L$ to the number of pixels of the other lamp candidate $g_L$ is within a predetermined range of, for example, 0.5 to 1.5.

Also, the lamp pair candidate extraction unit 13 determines whether the difference between the number of pixels (for example, the difference of the top end coordinate gtop and the bottom end coordinate gbottom described above of the reference region g as the lamp candidate $g_L$) of one lamp candidate $g_L$ in the vertical direction in the reference image T and the number of pixels of the other lamp candidate $g_L$ in the vertical direction in the reference image T is within a predetermined range of, for example, 10 pixels.

If the lamp candidates $g_L$ have sizes, that is, the numbers of pixels in the reference image T, that are too different or sizes in the vertical direction that are too different, the selected two lamp candidates $g_L$ cannot be considered to correspond to the left and right tail lamps TL of a vehicle. The above two conditions are conditions for excluding such a case.

Figure 9:
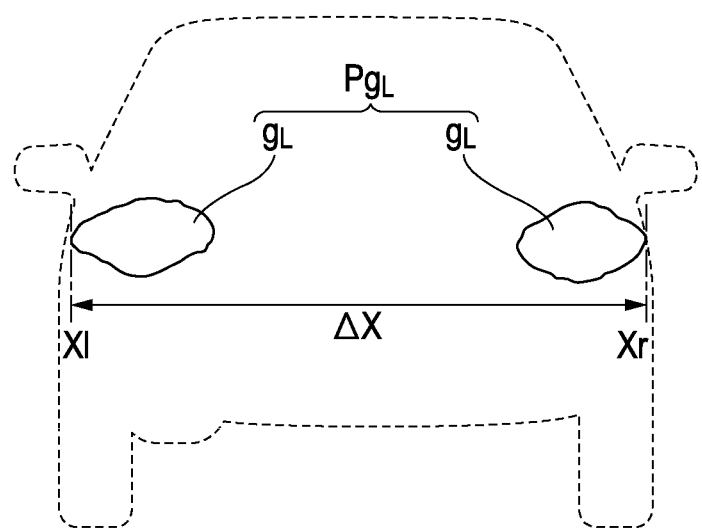
FIG. 9 is a diagram illustrating an example of a method of calculating an interval of two lamp candidates in the left and right direction in real space.

The lamp pair candidate extraction unit 13 also determines whether or not the interval between one lamp candidate $g_L$ and the other lamp candidate $g_L$ in the left and right direction in the real space is within the width of corresponding to the width of one vehicle (for example, 2.5 m). The interval between one lamp candidate $g_L$ and the other lamp candidate $g_L$ in the left and right direction in the real space is calculated, for example, as shown in FIG. 9, as a difference ΔX between an X coordinate Xr in the real space corresponding to the pixel at the right end gright of the right lamp candidate $g_L$ and an X coordinate Xl in the real space corresponding to the pixel at the left end gleft of the left lamp candidate $g_L$.

If the interval ΔX between the lamp candidates $g_L$ in the left and right direction is far larger than the width corresponding to one vehicle, the selected two lamp candidates $g_L$ cannot be considered to correspond to the left and right tail lamps TL of a vehicle. The above condition is a condition for excluding such a case.

Further, the lamp pair candidate extraction unit 13 determines whether or not the distance Z (corresponding to the parallax dp) and the height Y in the real space of one lamp candidate $g_L$ are within respective predetermined ranges from the position of the other lamp candidate in the real space. For example, the lamp pair candidate extraction unit 13 determines whether or not the distance Z and the height Y in the real space of one lamp candidate $g_L$ are within the range of 0.8 to 1.2 times the distance Z and the height Y in the real space of the other lamp candidate. If either one of the distance Z and the height Y is not within its predetermined range, the conditions are not determined to be satisfied.

If the difference of the distance Z or the height Y is too large between lamp candidates $g_L$, the selected two lamp candidates $g_L$ cannot be considered to correspond to the left and right tail lamps TL of a vehicle. The above condition is a condition for excluding such a case.

For example, as described above, if the subject vehicle is traveling on a multi-lane road and a vehicle of the same type as the leading vehicle Vah is traveling on the right adjacent lane, four lamp candidates $g_L$ corresponding to the tail lamps TL such as turn signal lamps and stop lamps of the vehicles may be laterally lined on the reference image T. If a method of prior art described in Japanese Patent Application Laid-Open No. 8-241500 is adopted, the right tail lamp TL of the leading vehicle Vah and the left tail lamp TL of the vehicle traveling on the right adjacent lane may be detected as the left and right tail lamps TL of one vehicle.

In the present embodiment, however, even when four lamp candidates $g_L$ are laterally lined on the reference image T as described above, s a lamp pair candidate $Pg_L$ is not extracted by the lamp pair candidate extraction unit 13 if there is a significant difference in the parallax dp or the distance Z in the real space between the right tail lamp TL the leading vehicle Vah and the left tail lamp TL of the vehicle traveling on the adjacent right lane based on position data detected by the position detection unit 9, that is, the distance image Tz created by the image processing unit 6 as a distance image creation unit in the present embodiment.

Thus, in the present embodiment, the possibility of erroneously detecting the tail lamps TL provided in a rear portion of different vehicles as the left and right tail lamps TL of one vehicle can be reduced even in the above case.

In the present embodiment, if the selected two lamp candidates $g_L$ satisfy one of the above described conditions (step S22; YES), the lamp pair candidate extraction unit 13 extracts the combination of the two lamp candidates $g_L$ as a lamp pair candidate $Pg_L$ (step S23). Then, the lamp pair candidate extraction unit 13 performs the extraction processing of the lamp pair candidates $Pg_L$ for all combinations of the lamp candidates $g_L$ extracted by the lamp candidate extraction unit 12 (step S20; NO).

As described above, some vehicles are provided with a high-mounted stop lamp. Thus, if the high-mounted stop lamp is mounted, the lamp pair candidate extraction unit 13 subsequently adds a lamp candidate $g_L$ corresponding to the high-mounted stop lamp to the lamp pair candidate $Pg_L$, which is a combination of the lamp candidates $g_L$ corresponding to the left and right tail lamps TL.

More specifically, the lamp pair candidate extraction unit 13 performs the above extraction processing of the lamp pair candidate $Pg_L$ for all combinations of the lamp candidates $g_L$ (step S20; YES) and subsequently, as shown in FIG. 10, determines whether not there is another lamp candidate $g_L$ positioned between and above the left and right lamp candidates $g_L$ as the extracted lamp pair candidate $Pg_L$ in the reference image T for each extracted lamp pair candidate $Pg_L$ (step S24).

Figure 10:
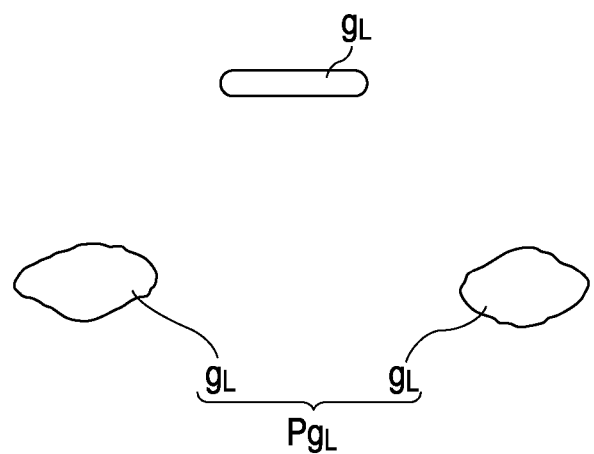
FIG. 10 is a diagram showing an example of another lamp candidate positioned between and above left and right lamps that are an extracted lamp pair candidate.

If there is another lamp candidate $g_L$ in the above position as shown in FIG. 10, (step S24; YES), the lamp pair candidate extraction unit 13 adds the another lamp candidate $g_L$ to the lamp pair candidate $Pg_L$ composed of the left and right lamp candidates $g_L$ as a high-mounted stop lamp (step S25).

Figure 11:
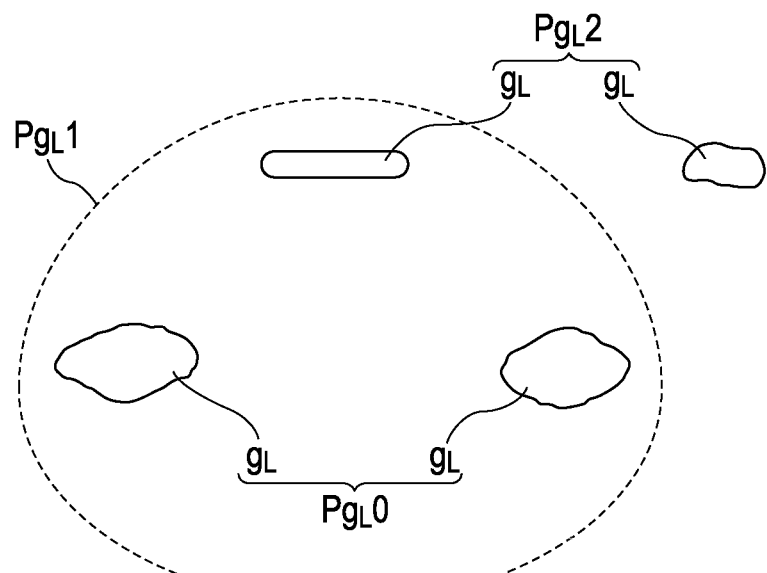
FIG. 11 is a diagram showing an example of a state in which a lamp candidate added as a high-mounted stop lamp belongs to another lamp pair candidate.

However, if, as shown in FIG. 11, the lamp candidate $g_L$ added as a high-mounted stop lamp belongs to another lamp pair candidate $Pg_L2$ other than a lamp pair candidate $Pg_L1$ to which the lamp candidate $g_L$ is added, an abnormal state arises in the reference image T in which the other lamp pair candidate $Pg_L2$ is captured above a lamp pair candidate $Pg_L0$ before the lamp candidate $g_L$ is added.

Thus, in the present embodiment, the lamp pair candidate extraction unit 13 determines whether or not the lamp candidate $g_L$ added as a high-mounted stop lamp as described above belongs to the lamp pair candidate $Pg_L2$ other than the lamp pair candidate $Pg_L1$ to which the lamp candidate $g_L$ has been added (step S26).

Figure 12:
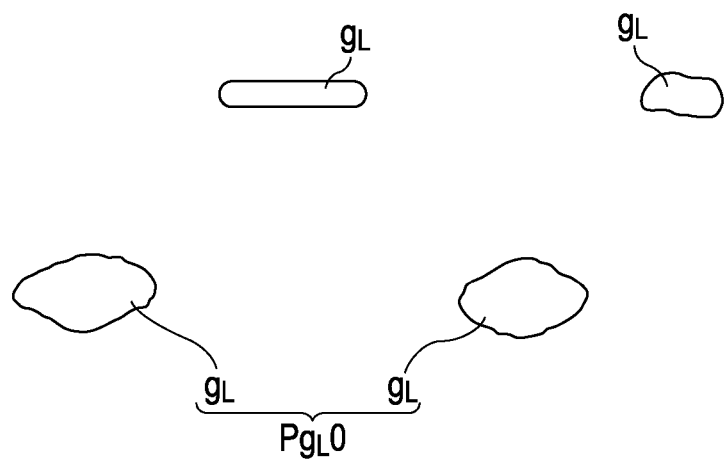
FIG. 12 is a diagram showing the state in which the lamp candidate added as the high-mounted stop lamp in FIG. 11 is excluded from the original lamp pair group.

Then, if the added lamp candidate $g_L$ belongs to the lamp pair candidate $Pg_L2$ other than the lamp pair candidate $Pg_L1$ to which the lamp candidate $g_L$ has been added (step S26; YES), the lamp pair candidate extraction unit 13 excludes the added lamp candidate $g_L$ from the added original lamp pair candidate $Pg_L1$, as shown in FIG. 12 (step S27). In this case, the lamp pair candidate $Pg_L1$ shown in FIG. 11 is returned to the original lamp pair candidate $Pg_L0$ as shown in FIG. 12.

Then, in the present embodiment, in this case, the lamp pair candidate extraction unit 13 is further configured to cancel the designation as a lamp pair candidate of the other lamp pair candidate $Pg_L2$ (see FIG. 11) to which the lamp candidate $g_L$ excluded from addition belongs, as shown in FIG. 12. Moreover, the lamp candidate $g_L$ excluded from addition may be also canceled as a lamp candidate.

The lamp pair candidate extraction unit 13 is configured to perform the processing from step S24 to step S27 for all extracted lamp pair candidates $Pg_L$ (step S28).

In the present embodiment, as described above, the lamp candidate extraction unit 12 extracts the pixel region g that is likely to correspond to the tail lamp TL of a vehicle as a lamp candidates $g_L$ among the pixel regions g integrated by the integration processing unit 11 as described above. Then the lamp pair candidate extraction unit 13 extracts a combination of the lamp candidates $g_L$ that may correspond to the left and right tail lamps TL or a high-mounted stop lamp of the vehicle as a lamp pair candidate $Pg_L$ among the lamp candidates $g_L$ extracted by the lamp candidate extraction unit 12.

In the present embodiment, a grouping unit 124 (see FIG. 1) is basically configured to group position data detected by the position detection unit based on the method described in aforementioned Japanese Patent No. 3349060 in FIGS. 20 to 26, but the present embodiment is configured differently in that regrouping processing is performed by using processing results of the lamp candidate extraction unit 12 or the lamp pair candidate extraction unit 13, that is, information about lamp candidates or lamp pair candidates.

In the present embodiment, the grouping unit 14 groups position data detected by the position detection unit 9. Among groups G that are generated by grouping and contain position data, the grouping unit 14 determines whether or not to regroup groups G which contain position data belonging to the lamp candidate $g_L$ extracted by the lamp pair candidate extraction unit 13, and regroups the groups G which are determined to be capable of being regrouped. A group G containing position data belonging to the lamp candidate $g_L$ is denoted as $G_L$.

Then, the grouping unit 14 determines whether or not to regroup all groups G including groups G containing position data that do not belong to the lamp candidate $g_L$ and regroups groups G determined to be capable of being regrouped, thereby performing grouping processing of groups containing position data and regrouping processing of groups.

In the regrouping processing by the grouping unit 14, a threshold of the position data for regrouping groups $G_L$ containing position data that belong to the lamp candidate $g_L$ is set to be easier for the regrouping processing than a threshold for regrouping all groups G thereafter.

While grouping and grouping have originally a same meaning, in the present invention, processing that groups position data detected by the position detection unit 9 is called grouping processing, and processing that groups generated groups by grouping processing again is called regrouping processing.

Figure 13:
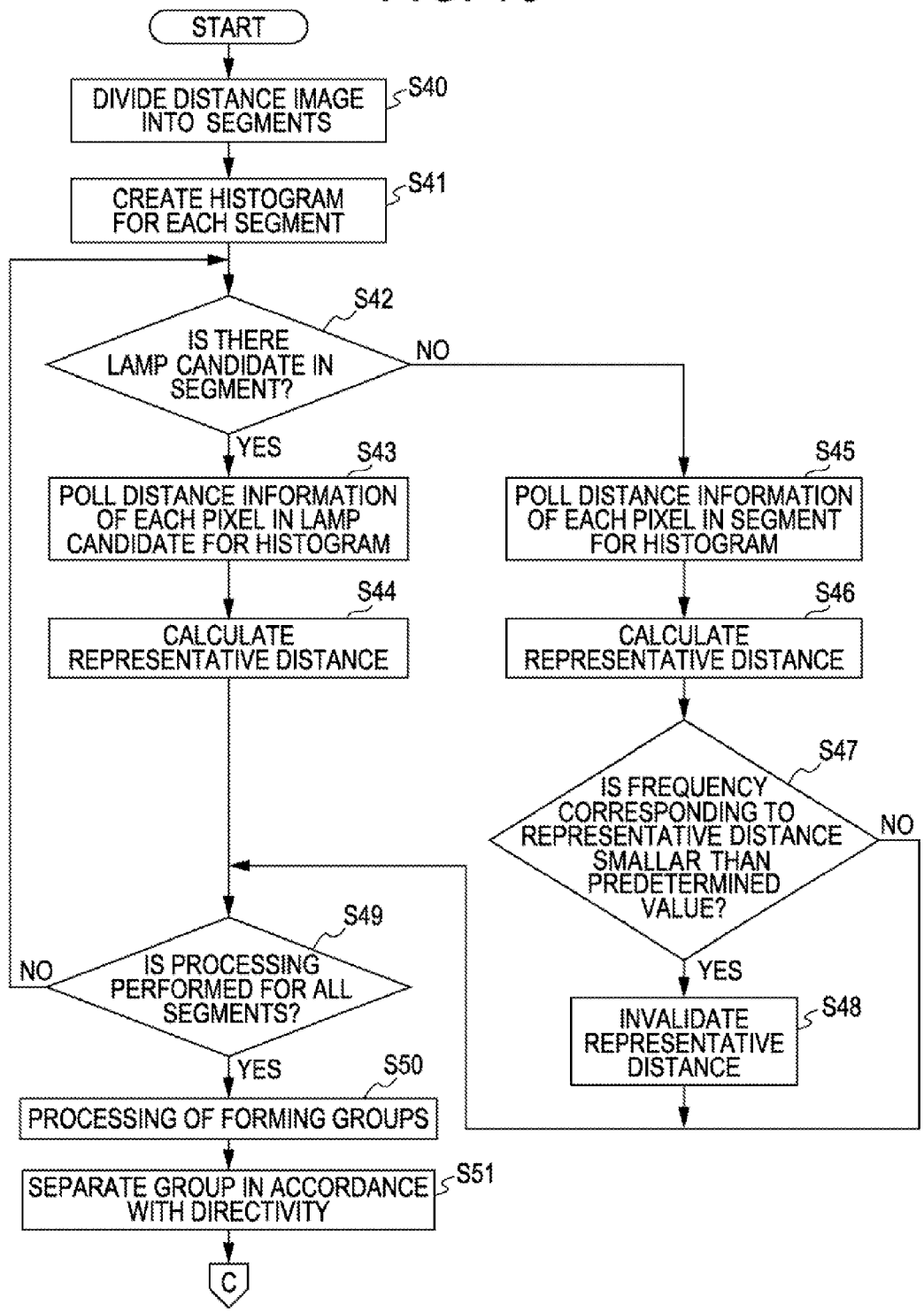
FIG. 13 is a flow chart showing the processing procedure for grouping processing by a grouping unit.

The grouping processing and the regrouping processing by the grouping unit 14 in the present embodiment will be described by using a flow chart shown in FIGS. 13 and 14.

Figure 20:
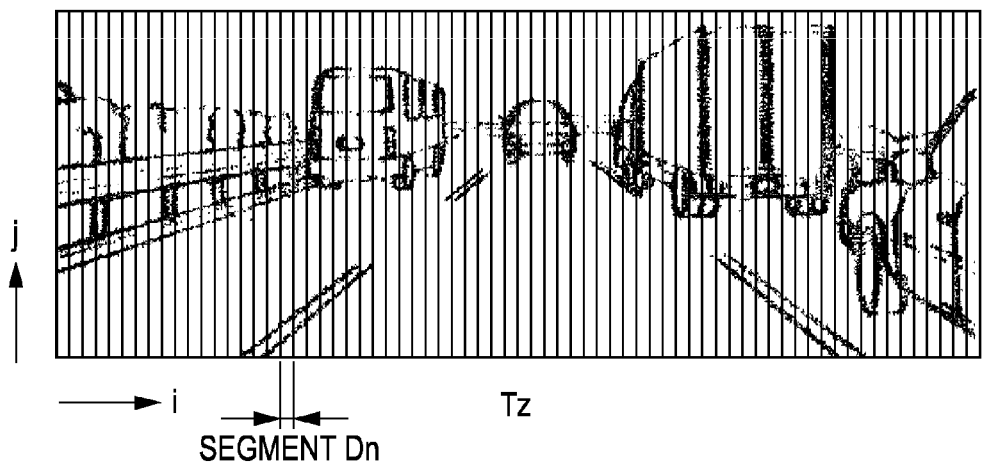
FIG. 20 is a diagram showing an example of the distance image divided into a plurality of segments.
Figure 21:
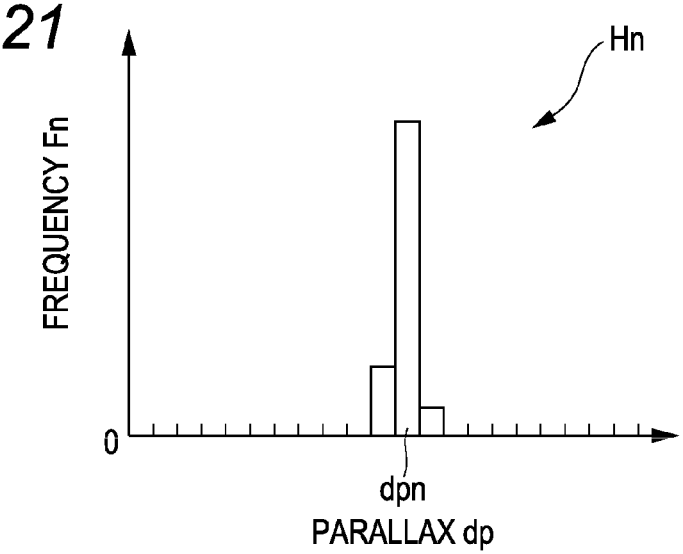
FIG. 21 is a diagram showing a histogram created for each segment Dn.
Figure 22:
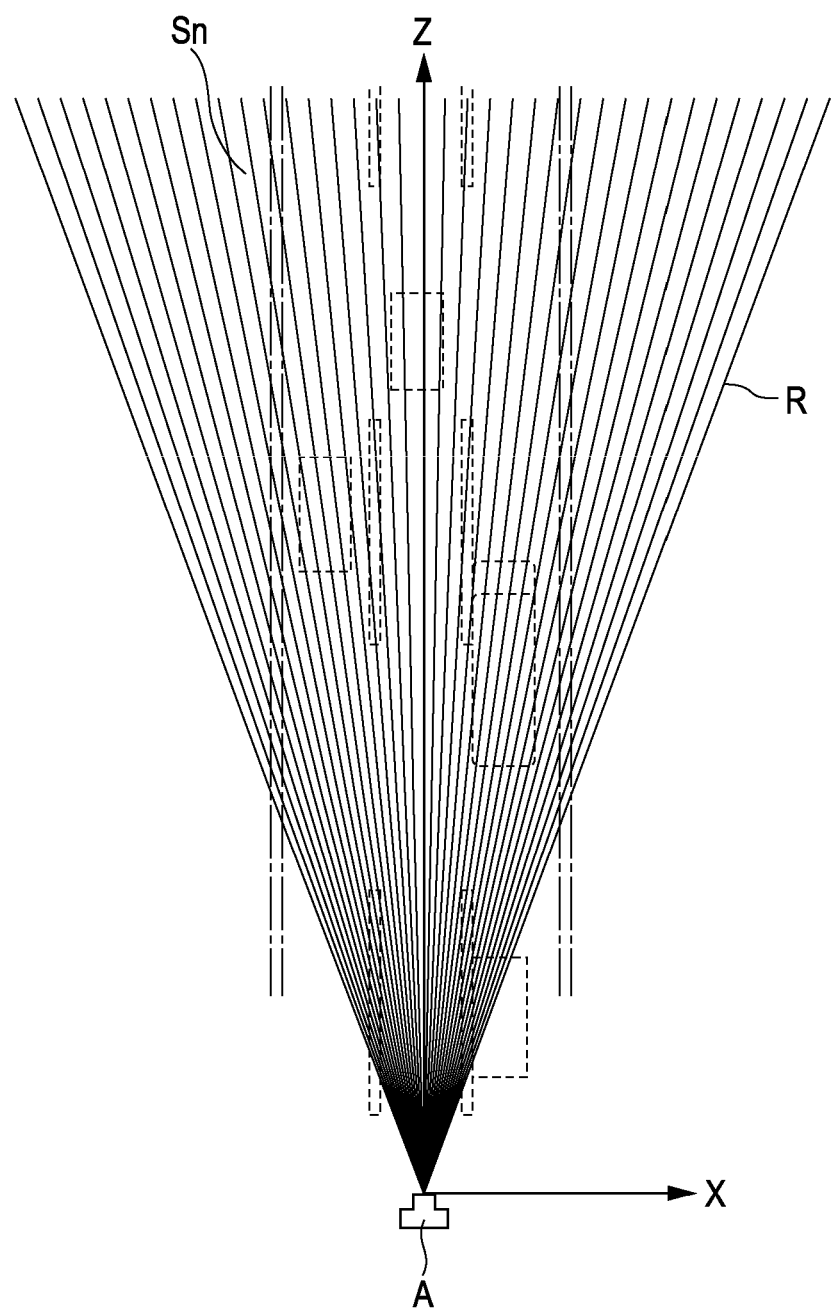
FIG. 22 is a diagram illustrating a plurality of segmented spaces corresponding to a plurality of segments dividing the distance image when the plurality of segments is put in a real space.

In the present embodiment, as shown in aforementioned FIG. 20, the grouping unit 14 first divides the distance image Tz created by the image processing unit 6 (see FIG. 1) serving as a distance image creation unit into a plurality of segments Dn in a thin rectangular shape extending in the vertical direction with a predetermined pixel width (step S40) and creates a histogram Hn for each segment Dn, as shown in FIG. 21 (step S41).

A method of prior art described in Japanese Patent No. 3349060 is configured to poll the parallax dp or the distance Z allocated to each pixel belonging to the segment Dn for the histogram Hn corresponding to the segment Dn. In the present embodiment, however, the grouping unit 14 is configured to utilize information about the lamp candidate $g_L$ extracted by the lamp candidate extraction unit 12 (see FIG. 1).

More specifically, the grouping unit 14 determines for each segment Dn whether or not there is the lamp candidate $g_L$ extracted by the lamp candidate extraction unit 12 in the segment Dn (step S42). If there is the lamp candidate $g_L$ in the segment Dn (step S42; YES), information about the distance in position data (i, j, dp) allocated to each pixel in the lamp candidate $g_L$, that is, the parallax dp in the present embodiment is polled for the histogram Hn (step S43).

In this case, even if the parallax dp is allocated to a pixel other than the lamp candidate $g_L$ in the segment Dn, the parallax dp is not polled for the histogram Hn. Then, the grouping unit 14, for example, calculates the class value of a class to which the mode belongs in the histogram Hn is set as a representative distance, that is, as the representative parallax dpn, in the present embodiment in the segment Dn (step S44).

If there is no lamp candidate $g_L$ in the segment Dn (step S42; NO), similarly to the method described in Japanese Patent No. 3349060, the grouping unit 14 polls information about the distance in position data allocated to each pixel in the segment Dn, that is, the parallax dp for the histogram Hn (step S45) and calculates, for example, the class value of a class to which the mode in the histogram Hn belongs is set as the representative parallax dpn (representative distance) in the segment Dn (step S46).

In this case, if, for example, a frequency Fn (see FIG. 21) of the class of the histogram Hn corresponding to the calculated representative parallax dpn is too for the mode, the reliability of the calculated representative parallax dpn is low.

Thus, in the present embodiment, the grouping unit 14 determines whether or not the frequency Fn of the class of the histogram Hn corresponding to the representative parallax dpn of the segment Dn calculated for the case where there is no lamp candidate $g_L$ in the segment Dn as described above (step S42; NO) is smaller than a predetermined value (step S47).

If the frequency Fn corresponding to the representative parallax dpn is smaller than predetermined value (step S47; YES), the representative parallax dpn is invalidated for the segment Dn (step S48). Thus, the grouping unit 14 performs the grouping processing by assuming that there is no representative parallax dpn for the segment Dn for which the representative parallax dpn is invalidated.

If there is the lamp candidate $g_L$ present in the segment Dn (step S42; YES), the determination processing regarding whether or not to invalidate the representative parallax dpn based on the frequency Fn corresponding to the representative parallax dpn (step S47) is not performed. Thus, in this case, the representative parallax dpn will not be invalidated even if the frequency Fn of the class of the histogram Hn corresponding to the representative parallax dpn calculated by the processing in step S44 is small.

Then, if the processing of steps S42 to S48 is not performed for all segments Dn (step S49; NO), the grouping unit 14 performs the processing of steps S42 to S48 for each segment Dn to calculate the representative parallax dpn for all segments Dn including the case where the representative parallax dpn is invalidated and is not present.

With the configuration described above, in the case where there is the lamp candidate $g_L$ in the segment Dn, the representative parallax dpn (representative distance) calculated from the parallax dp of each pixel in the lamp candidate $g_L$ is preferentially calculated as the representative parallax dpn of the segment Dn even if there are more pixels to which the parallax dp that is different from the representative parallax dpn calculated from the parallax dp allocated to each pixel in the lamp candidate $g_L$ in the segment Dn than pixels to which the representative parallax dpn in the lamp candidate $g_L$ is allocated (that is, even if the frequency Fn of the former is larger than the frequency Fn of the latter).

Thus, if there is the lamp candidate $g_L$ in the segment Dn, instead of the parallax dp allocated to a pixel of a portion other than the lamp candidate $g_L$ present in the segment Dn, the representative parallax dpn in the lamp candidate $g_L$ corresponding to the tail lamp TL of a vehicle can reliably be extracted as the representative parallax dpn of the segment Dn.

In the present embodiment, after the representative parallax dpn (representative distance) for each segment Dn is calculated as described above (steps S44, S46, or S48), similarly to the method described in Japanese Patent No. 3349060, the grouping unit 14 performs grouping processing for position data of each segment Dn including the representative parallax dpn as intended for grouping (step S50).

Figure 23:
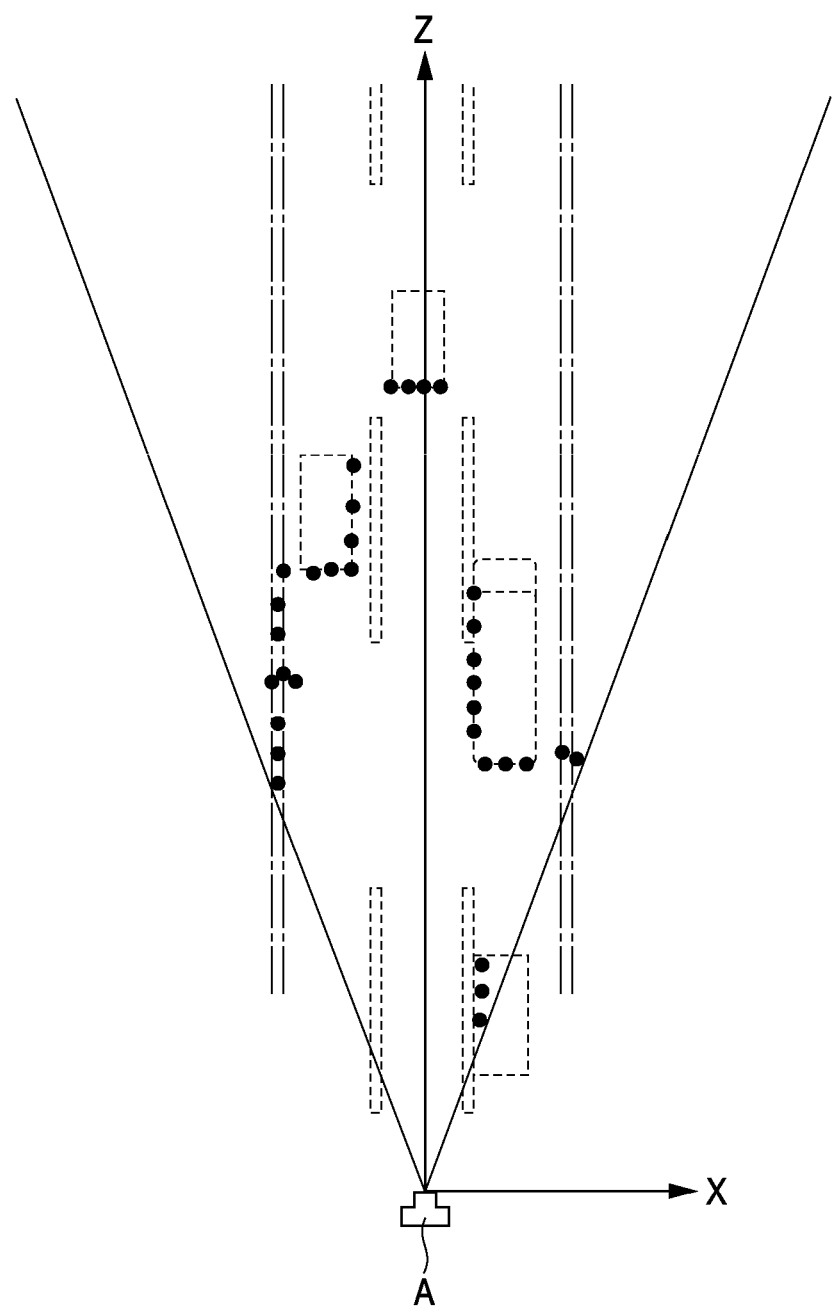
FIG. 23 is a diagram obtained by plotting a representative distance of each segment in the real space.

If two-dimensional position data (X, Z) in the real space corresponding to the representative parallax dpn for each segment Dn is calculated by substituting the representative parallax dpn calculated for each segment Dn and, for example, the i coordinate of the intermediate point of the pixel width in the lateral direction (that is, the i coordinate direction in the distance image Tz shown in FIG. 20) of each segment Dn in a thin rectangular shape into aforementioned Formulas (1) and (3) and plotted on a flat surface in the real space, each point in the real space corresponding to the representative parallax dpn for each segment Dn is plotted, as shown in FIG. 23, with some variations in portions corresponding to the vehicles in front of the subject vehicle.

Regarding each point plotted as described above, the grouping unit 14 determines whether or not an interval in the X axis direction (left and right direction) between adjacent points in the real space is within a set threshold, and whether or not an interval in the Z axis direction (distance direction) is within a set threshold. If the interval in the X axis direction and the interval in the Z axis direction are both within the respective thresholds, the grouping unit 14 groups these adjacent points as a group G.

Figure 24:
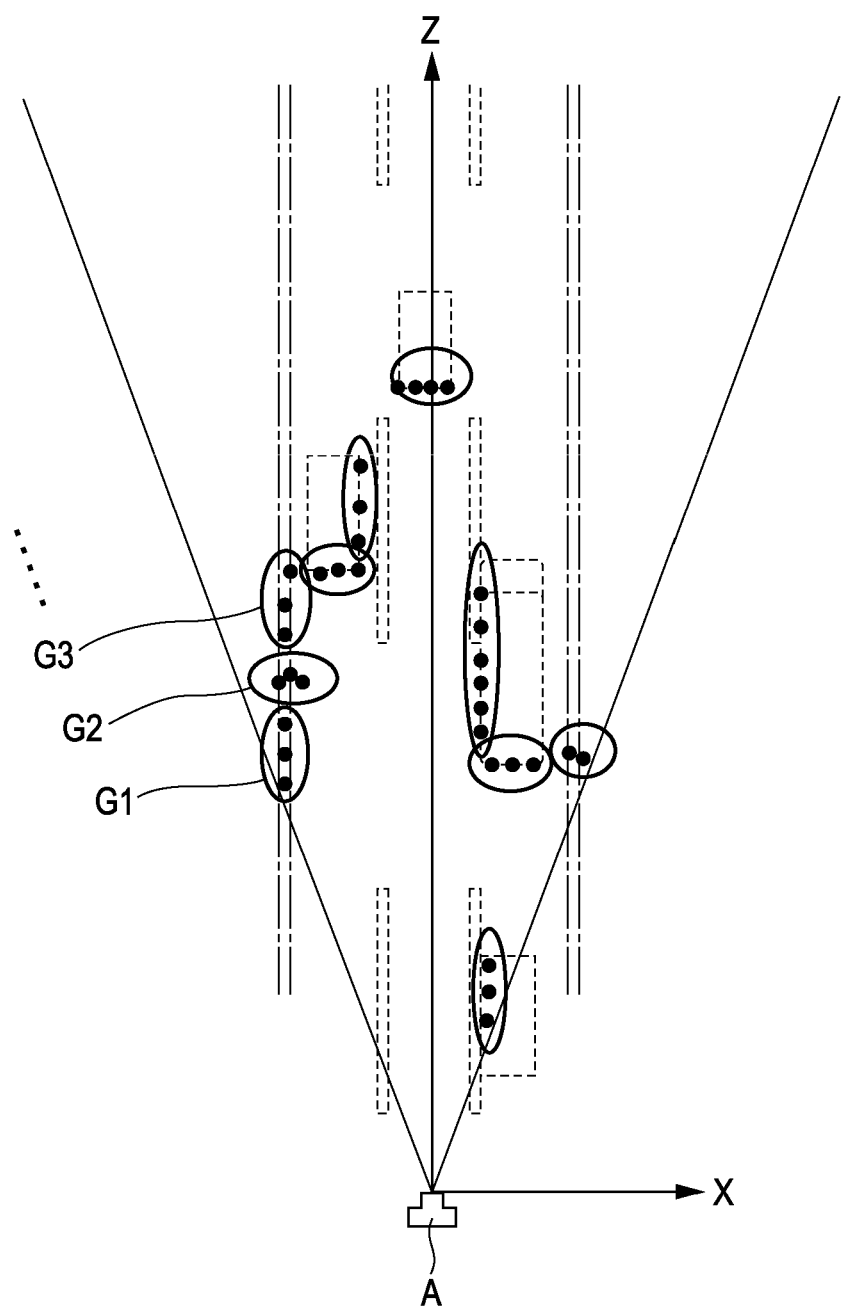
FIG. 24 is a diagram illustrating grouping the points in FIG. 23.

If one group G generated by grouping contains a portion of points extending in the left and right direction (that is, the X axis direction) and a portion of points extending in the distance direction (that is, the Z axis direction), as shown in FIG. 24, the grouping unit 14 separates the one group G generated by the grouping processing into a plurality of groups G according to the direction thereof (step S51). Refer to Japanese Patent No. 3349060 for more information on this point.

Subsequently, the grouping unit 14 performs regrouping processing for each group G generated by grouping (step S50) and separation (step S51).

Figure 14:
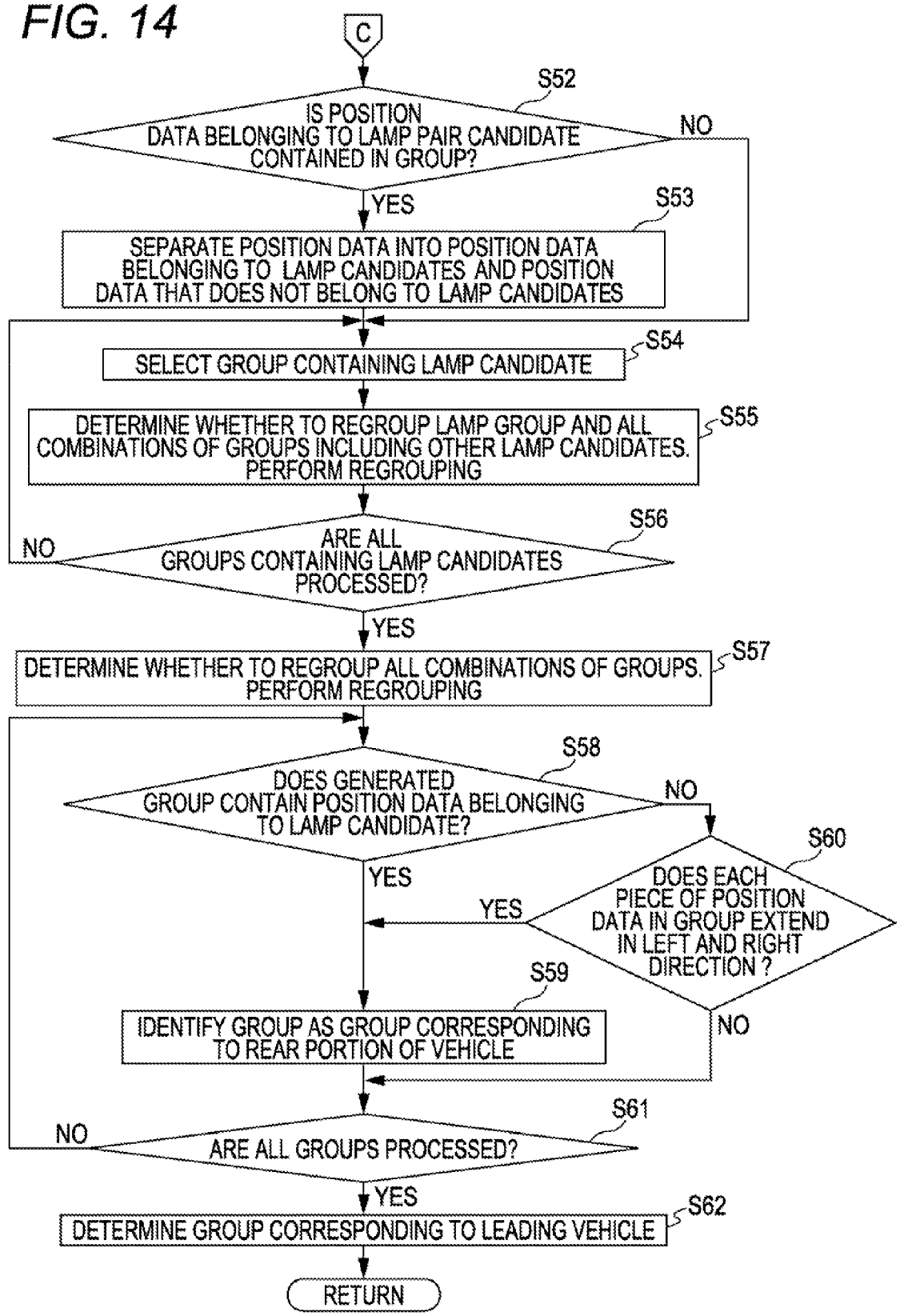
FIG. 14 is a flow chart showing the processing procedure for regrouping processing by the grouping unit.

More specifically, as shown in the flow chart in FIG. 14, the grouping unit 14 first determines whether or not the generated group G contained position data belonging to the aforementioned lamp pair candidate $Pg_L$ extracted by the lamp pair candidate extraction unit 13 (step S52).

If the group G contains position data belonging to the lamp pair candidate $Pg_L$ (step S52; YES), the grouping unit 14 forcibly separates the position data in the group into position data belonging to the lamp candidates $g_L$ constituting the lamp pair candidate $Pg_L$ (that is, points in FIG. 24) and position data not belonging to the lamp candidates $g_L$ so as to form separate groups G. In other words, the grouping unit 14 separates the group G into a group $G_L$ constituted of position data belonging to the lamp candidates $g_L$ and a group G containing no position data belonging to the lamp candidates $g_L$.

Figure 31:
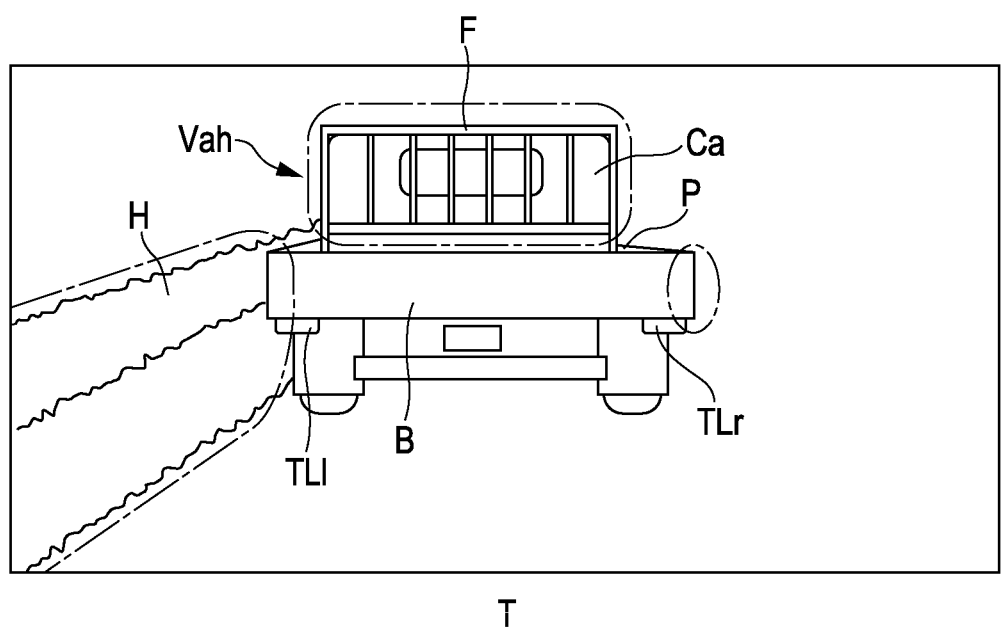
FIG. 31 is a diagram showing the image in which the flat-bodied truck with the load-carrying platform as the leading vehicle and the hedge are captured adjacent to each other.
Figure 32:
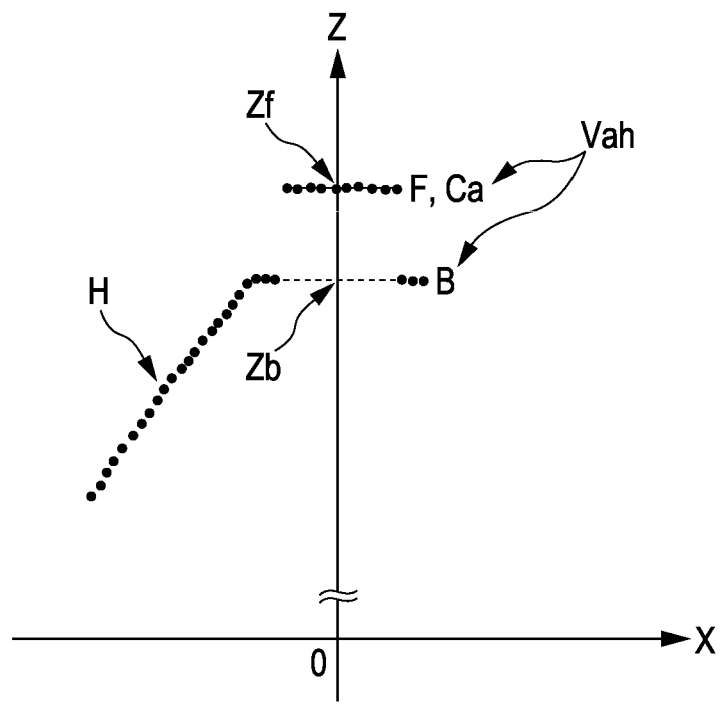
FIG. 32 is a diagram illustrating the state in which the left edge portion of the rear gate of the load-carrying platform of the leading vehicle and the hedge in FIG. 31 are detected with being integrated.

As described above, in a scene as shown, for example, in FIG. 31, according to the method of prior art described in Japanese Patent No. 3349060, the left and right edge portions of the rear gate B of the load-carrying platform P of a flat-bodied truck with a platform, which is the leading vehicle Vah cannot be grouped and the left edge portion may be integrated with the with the hedge H into one group, as shown in FIG. 32.

In the present embodiment, however, even if the left tail lamp TL1 (see FIG. 31) of the flat-bodied truck with a platform, which is the leading vehicle Vah, and the hedge H should be put together as a group in the grouping processing (step S50 in FIG. 13), the lamp pair extraction unit 13 extracts the lamp candidates $g_L$ corresponding to the left tail lamp TL1 and the right tail lamp TLr as a lamp pair extraction candidate $Pg_L$.

Figure 15:
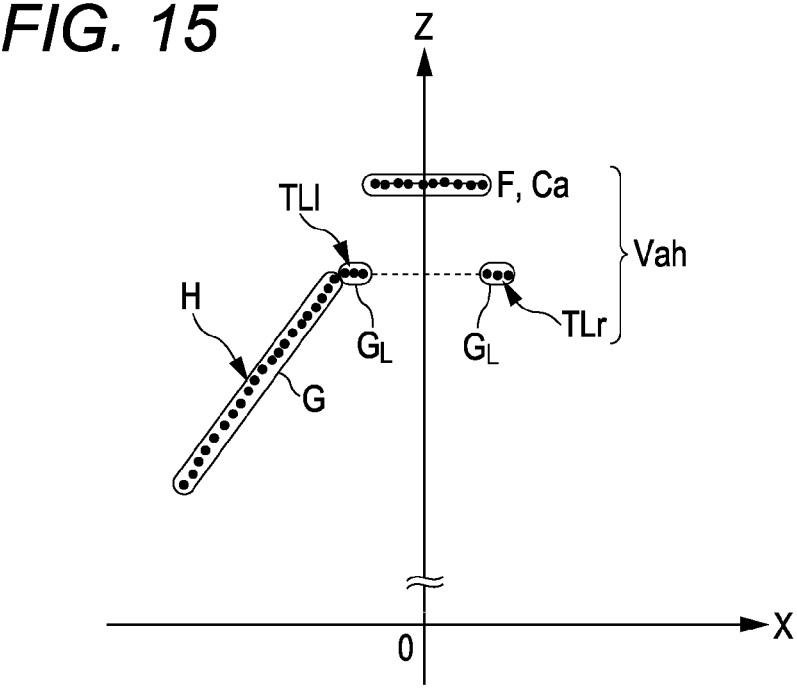
FIG. 15 is a diagram showing the state in which a group containing a left tail lamp and a hedge is separated into a group containing the left tail lamp and a group G containing the hedge.

Thus, by performing the determination processing in step S52 and the separation processing in step S53 in FIG. 14, as shown in FIG. 15, one group containing the left tail lamp TL1 and the hedge H is separated into the group $G_L$ that contains the left tail lamp TL1 and the group G that contains the hedge H but does not contain position data belonging to the lamp candidate $g_L$, whereby the tail lamp TL1 and the hedge H can be accurately separated into the different groups $G_L$, G.

In this case, one segment Dn (see FIG. 20) of the distance image Tz may contain the front wall F or a rear portion of the cab Ca of the flat-bodied truck with a platform and the left tail lamp TL1 (the same applies to the right tail lamp TLr).

However, even if, as described above, a high parallax dp should be calculated for each pixel corresponding to the front wall F or the edge portion of the cab Ca in such the segment Dn, the representative parallax dpn calculated from the parallax dp of each pixel in the lamp candidate $g_L$ corresponding to the left tail lamp TL1 is preferentially calculated as the representative parallax dpn of the segment Dn.

Therefore, the representative parallax dpn or position data corresponding to the left tail lamp TL1 is reliably extracted. As a result, by performing the separation processing (steps S52 and S53) by the grouping unit 14 as described above, the group $G_L$ corresponding to the left tail lamp TL1 and the group G corresponding to the hedge H are reliably separated to form different groups.

Subsequently, the grouping unit 14 selects any of one group $G_L$ containing position data belonging to the lamp candidate $g_L$ from the groups G (step S54) and determines whether or not to perform regrouping for all combinations of the group $G_L$ and groups $G_L$ containing position data belonging to other lamp candidates $g_L$ (step S55).

In this case, in the regrouping determination, for example, a determination that groups can be regrouped can be made if the following two conditions are satisfied.

For a first threshold $\Delta dpth$ (or $\Delta zth$) for the regrouping determination one piece of position data each group $G_L$ is selected from among pieces of position data belonging to two groups $G_L$, the one piece of position data being closest in one of the group to the other group. Then, it is determined whether or not a difference $\Delta dp$ (or $\Delta z$) of the representative parallaxes dpn (or the representative distances Zn, hereinafter the same shall apply) of the selected position data is within 10%, that is, the ratio of the representative parallax dpn of the selected position data at one group $G_L$ to the representative parallax dpn of the selected position data at the other group $G_L$ is within a range of 0.9 to 1.1 times.

For a second threshold $\Delta xth$ for the regrouping determination, an interval $\Delta x$ between positions in the left and right direction (that is, X coordinates) in the real space of the two selected pieces of position data selected from two groups $G_L$ is set to within 2 m, and it is determined whether or not the interval $\Delta x$ is within this range is.

In the present embodiment, the grouping unit 14 determines that a combination of the one group $G_L$ and the another group $G_L$ which are selected can be regrouped if the above two conditions are satisfied and regroups the one selected group $G_L$ and the another group $G_L$ which are determined to be capable of being regrouped (step S55).

The grouping unit 14 determines whether or not to perform regrouping for all combinations of the one selected group $G_L$ and the another groups $G_L$ and to perform regrouping when they are determined to be capable of being regrouped.

If the regrouping determination and regrouping processing with the another groups $G_L$ is not is not performed for all groups $G_L$ (step S56; NO), the grouping unit 14 repeats determination and regrouping processing with the another groups $G_L$ (steps S54 and S55) for all groups $G_L$.

The thresholds $\Delta dpth$ (or $\Delta zth$) and $\Delta xth$ used for determining whether not to regroup groups $G_L$ containing position data belonging to the lamp candidate $g_L$ are set to be easier for regrouping than thresholds $\Delta dpth^*$ (or $\Delta zth^*$) and $\Delta xth^*$ that will be described later and are used for subsequently regrouping all groups G.

The above described configuration first performs regrouping processing for groups $G_L$ containing position data belonging to the lamp candidate $g_L$ using the thresholds $\Delta dpth$ (or $\Delta zth$) and $\Delta xth$ easier for regrouping with groups G that do not contain position data belonging to the lamp candidate $g_L$ being excluded. Accordingly, in, for example, the above-described scene shown in FIG. 31, it is possible to determine whether or not to perform regrouping for the groups $G_L$ corresponding to the left and right tail lamps TL1 and TLr containing position data belonging to the lamp candidate $g_L$ among the groups G formed as shown in FIG. 15.

Figure 16:
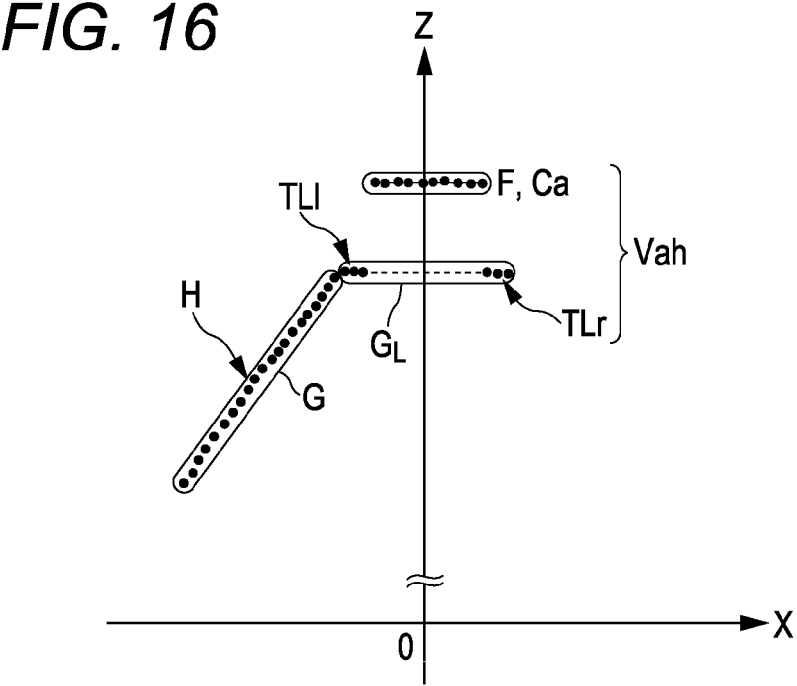
FIG. 16 is a diagram showing the state in which the groups corresponding to the left and right tail lamps are grouped into one new group by performing the regrouping processing to the state in FIG. 15.

Since the above two conditions are satisfied by the groups $G_L$ corresponding to the left and right tail lamps TL1 and TLr, The groups $G_L$ corresponding to the left and right tail lamps TL1 and TLr can preferentially be regrouped, and, as shown in FIG. 16, the groups $G_L$ corresponding to the left and right tail lamps TL1 and TLr can be formed into a new group $G_L$.

When the above processing is performed for all groups $G_L$ containing position data belonging to the lamp candidate $g_L$ (step S56; YES), the grouping unit 14 subsequently determines whether or not to perform regrouping for combinations of all groups G including regrouped groups $G_L$ and groups $G_L$ that are not regrouped, and performs regrouping when the groups $G_L$ are determined to be capable of being grouped (step S57).

Upon the regrouping determination in step S57, for example, the difference $\Delta dp$ (or $\Delta z$) is set to within 5% as the first threshold $\Delta dpth^*$ (or $\Delta zth^*$) described above, and the interval $\Delta x$ in the left and right in the real space is set to within 1 m as the second threshold $\Delta xth^*$, whereby these thresholds make regrouping more difficult than the thresholds $\Delta dpth$ (or $\Delta zth$) and $\Delta xth$ used for determining whether not to perform regrouping groups $G_L$ containing position data belonging to the lamp candidate $g_L$.

In actuality, rather than as thresholds making regrouping more difficult, the thresholds $\Delta dpth^*$ (or $\Delta zth^*$) and $\Delta xth^*$ used for determining whether or not to perform regrouping in step S57 are set as thresholds capable of accurately dividing and detecting objects including a vehicle in a normal scene as shown, for example, in FIG. 18 even though a problems as shown, for example, in FIGS. 31 and 32 arise.

Then, the thresholds $\Delta dpth$ (or $\Delta zth$) and $\Delta xth$ used for used for determining whether or not to perform regroup groups $G_L$ containing position data belonging to the lamp candidate $g_L$ in the determination processing in step S55 are rather set as more loose thresholds and to be easier for regrouping.

When the above processing is completed, if the generated group G is a group $G_L$ containing position data belonging to the lamp candidate $g_L$ (step S58; YES), the grouping unit 14 subsequently identifies the group G (that is, the group $G_L$) as a group corresponding to the rear portion of a vehicle (step S59) and stores information about the detected group G (that is, the group $G_L$) in a memory.

Even in the case where the generated group G is a group G that does not contain position data belonging to the lamp candidate $g_L$ (step S58; NO), if each piece of position data in the group G extends in the left and right direction (that is, the X axis direction) in the real space (step S60; YES), the grouping unit 14 identifies the group G as a group corresponding to the rear portion of a vehicle (step S59) and stores information about the detected group G in a memory.

In this stage, for example, a probability representing a reliability of identification of the groups $G_L$ and G identified as a group corresponding to the rear portion of a vehicle may be calculated.

For example, the probability may be given such that a high probability is given if each group identified as a group corresponding to the rear portion of a vehicle is groups $G_L$ containing position data belonging to the lamp candidate $g_L$ and a further higher probability is given if the group $G_L$ containing position data belonging to the lamp candidate $g_L$ contains all lamp candidates $g_L$ (as described above, the lamp candidate $g_L$ corresponding to a high-mounted stop lamp may be contained) constituting one lamp pair candidate $Pg_L$ extracted by the lamp pair candidate unit 13.

In addition, a lower probability may be given if, for example, each group identified as a group corresponding to the rear portion of a vehicle is a group G containing no position data belonging to the lamp candidate $g_L$.

On the other hand, if the generated group G is a group G that does not contain position data belonging to the lamp candidate $g_L$ (step S58; NO) and each piece of position data in the group G extends in the distance direction (that is, the Z axis direction) in the real space (step S60; NO), the grouping unit 14 does not identify the group G as a group corresponding to the rear portion of a vehicle and identifies as an object extending in the traveling direction (that is, the Z direction) of the subject vehicle such as a side portion of a vehicle or the hedge H described above (see, for example, FIG. 31). It is appropriately determined whether or not to store the information in a memory.

Figure 25:
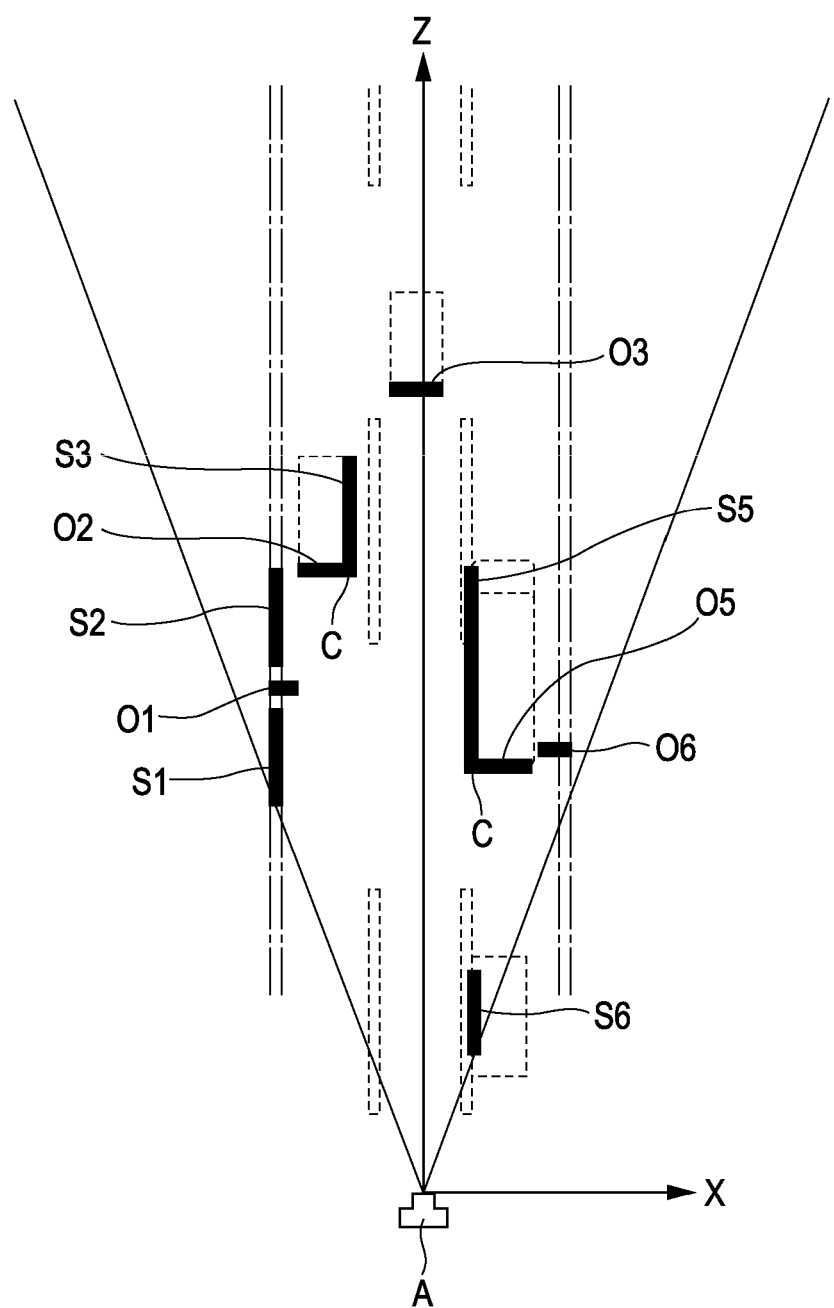
FIG. 25 is a diagram showing objects obtained by linear approximation of the points belonging to the groups in FIG. 24.
Figure 26:
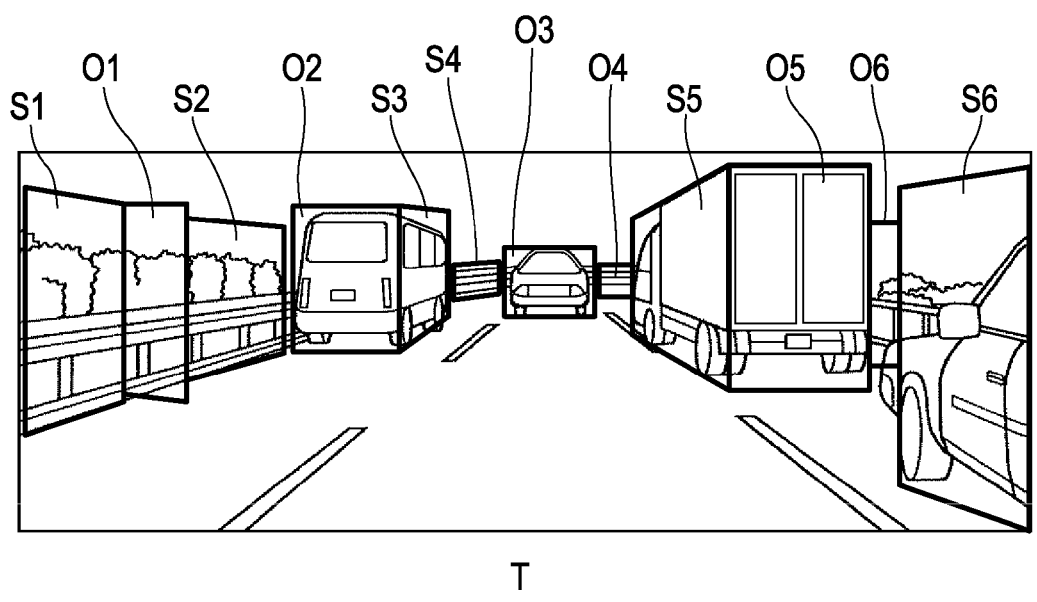
FIG. 26 is a diagram showing the detected objects surrounded by rectangular closing lines on the reference image.
Figure 27:
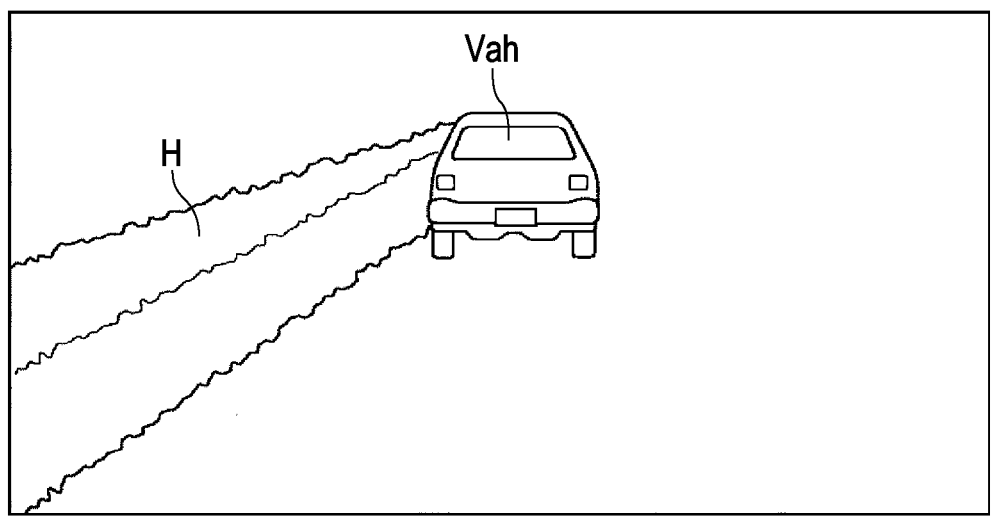
FIG. 27 is a diagram showing an image in which a leading vehicle and a hedge are captured adjacent to each other.
Figure 28A:
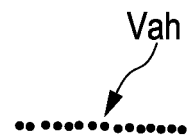
FIG. 28A is a diagram illustrating the state in which only the leading vehicle is detected.
Figure 28B:
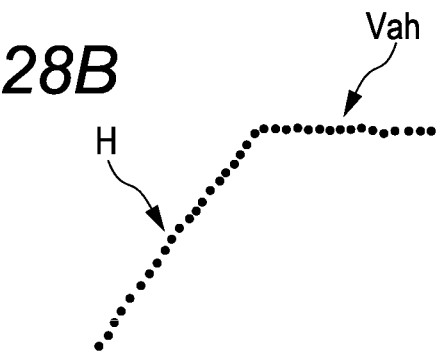
FIG. 28B shows the state in which the leading vehicle and the hedge are detected as one object.
Figure 29:
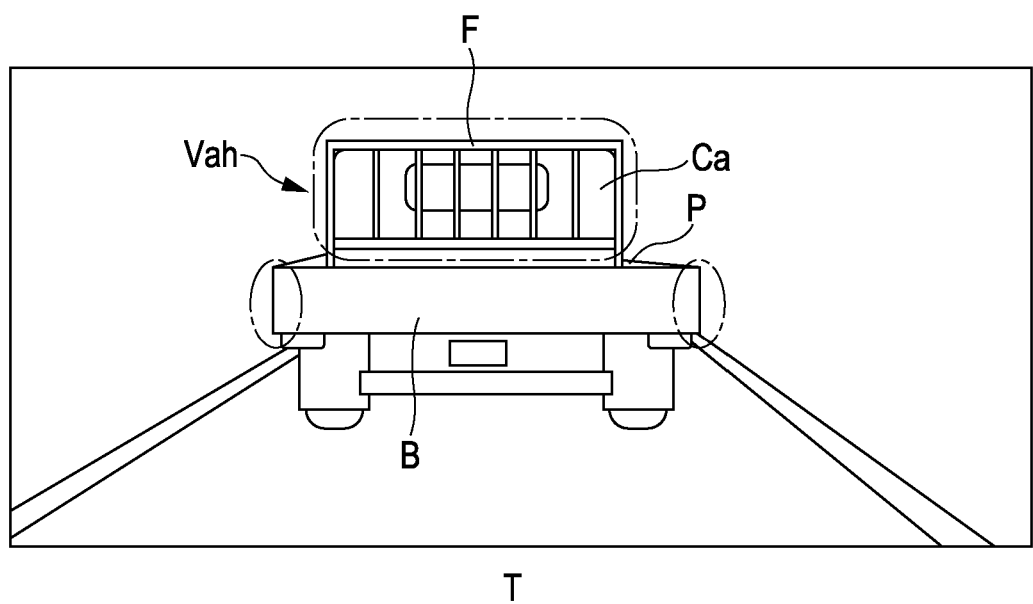
FIG. 29 is a diagram showing an image in which a flat-bodied truck with a load-carrying platform is captured as the leading vehicle.
Figure 30:
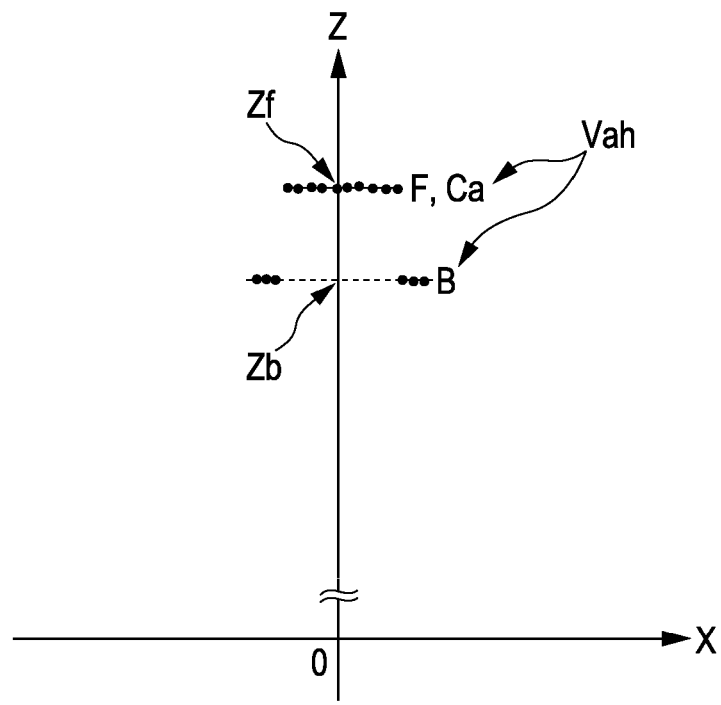
FIG. 30 is a diagram illustrating the state in which edge portions on the left and right sides of a rear gate of the load-carrying platform of the leading vehicle in FIG. 29 are not grouped, and the edge portions on the left and right sides and a front wall portion are detected as separate objects.

For the groups $G_L$ and G identified as groups corresponding to the rear portion of a vehicle and the groups $G_L$ and G identified as object extending in the traveling direction (that is, the Z direction) of the subject vehicle, processing is appropriately performed such as linear approximation of each piece of position data belonging to the group $G_L$ and G as shown in FIG. 25, and surrounding and displaying the objects such as vehicles corresponding to the detected groups $G_L$ and G with rectangular closing lines in the reference image T as shown in FIG. 26.

If the above described processing is not performed for all groups $G_L$ and G (step S61; NO), the grouping unit 14 repeats the processing in steps S58 to S60 described above. When the processing is performed for all groups $G_L$ and G (step S61; YES), the grouping unit 14 determines a group Gah corresponding to the leading vehicle Vah from among the detected groups $G_L$ and G (step S62), and then finishes the processing.

When the grouping unit 14 finishes the above described processing, the processing unit 10 sends necessary information stored in the memory to an external apparatus and also, to restart a sequence of the processing from step S1 shown in FIG. 3.

In the processing in step S62 in FIG. 14, the leading vehicle Vah may be determined, for example, as below. In later-described FIG. 17, similarly to the case shown in FIG. 26, groups $G_L$ and G whose position data extends in the left and right direction are denoted as groups O and groups $G_L$ and G whose position data extends in the distance direction are denoted as groups S.

Figure 17:
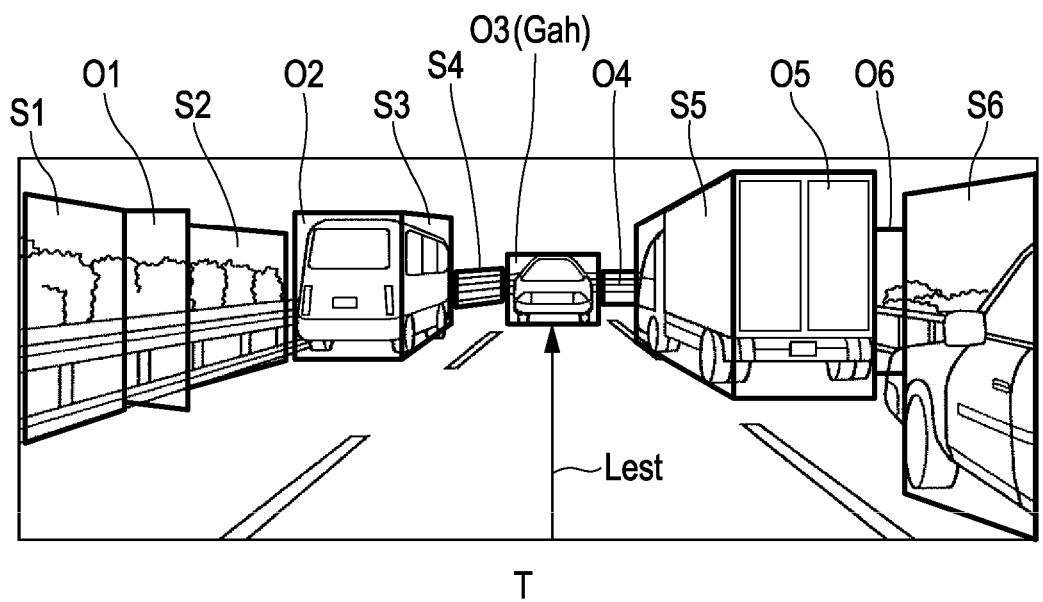
FIG. 17 is a diagram showing the state in which a leading vehicle is identified based on a travel track of a subject vehicle.

In the determination processing of the leading vehicle Vah, as shown in FIG. 17, a track on which the subject vehicle will travel is estimated as a traveling track Lest based on behavior (that is, speed, yaw rate, steering angle of a steering wheel and the like) of the subject vehicle.

Specifically, the traveling track Lest of the subject vehicle can be calculated based on a turning curvature Cua of the subject vehicle calculated according to Formula (4) or Formulas (5) and (6) shown below based on a speed V, yaw rate γ, and steering angle δ of a steering wheel of the subject vehicle. In the formulas below, Re denotes a turning curvature, Asf denotes a stability factor of the vehicle, and Lwb denotes a wheel base.

$$Cua = \gamma/V \tag{4}$$

$$Re = (1 + Asf \cdot V^2) \cdot (Lwb/\delta) \tag{5}$$

$$Cua = 1/Re \tag{6}$$

As shown in FIG. 17, the group Gah corresponding to the leading vehicle Vah can be detected, as a group $G_L$ or a group G (that is, a group O) present on the traveling track Lest of the subject vehicle or as a group O present within a region of the width of the subject vehicle around the traveling track Lest. In FIG. 17, for example, a group O3 is detected as the group Gah corresponding to the leading vehicle Vah.

The leading vehicle Vah can be tracked while maintaining consistency by, for example, calculating the probability that the group Gah corresponding to the leading vehicle Vah detected in a last sampling period and the group Gah corresponding to the leading vehicle Vah detected in a current sampling period correspond to a same leading vehicle.

With the above described configuration, it is possible to accurately detect a change of the leading vehicle Vah due to the case where the detected leading vehicle Vah deviates from the front of the subject vehicle, thereby causing a vehicle traveling further forward to become a new leading vehicle Vah or another vehicle pushes in between the subject vehicle and the leading vehicle Vah, thereby causing the vehicle to become a new leading vehicle Vah.

As described above, according to the vehicle detection apparatus 1 of the present embodiment, similarly to the above described method disclosed in Japanese Patent No. 3349060, the grouping unit 14 groups position data detected by the position detection unit 9 to generate the groups G corresponding objects including a vehicle.

The grouping unit 14 further performs processing for the groups G generated by grouping, that is, determines whether or not to regroup groups $G_L$ containing position data belonging to the lamp candidate $g_L$ extracted by the lamp candidate extraction unit 12, and regroups the groups $G_L$ which are determined to be capable of regrouped. Then, the grouping unit 14 performs the regrouping determination for all groups G including the groups $G_L$ and regroups groups $G_L$ and G which are determined to capable of regrouped.

Moreover, the thresholds Δdpth (or Δzth) and Δxth about position data used for determining whether or not to regroup groups $G_L$ containing position data belonging to the lamp candidate $g_L$ are set to be easier for regrouping than the thresholds Δdpth* (or Δzth*) and Δxth* used for subsequently regrouping all groups $G_L$ and G.

Thus, groups G containing no position data belonging to the lamp candidate $g_L$ are excluded and regrouping processing is first performed on groups $G_L$ containing position data belonging to the lamp candidate $g_L$ by using the thresholds Δdpth (or Δzth) and Δxth which are set easier for regrouping. Therefore, even in a scene as shown, for example, in FIG. 31, it is possible to first determine whether or not the groups $G_L$ corresponding to the left and right tail lamps TL1 and TLr containing position data belonging to the lamp candidate $g_L$ among groups G formed as shown in FIG. 15 can be regrouped.

Then, the groups $G_L$ corresponding to the left and right tail lamps TLl and TLr can preferentially be regrouped and, as shown in FIG. 16, the groups $G_L$ corresponding to the left and right tail lamps TLl and TLr can be formed into a new group $G_L$.

Thus, according to the vehicle detection apparatus 1 in the present embodiment, it is first determined whether or not to regroup the lamp candidates $g_L$ corresponding to the tail lamp TL such as a turn signal lamp and stop lamp of a vehicle. Then, regrouping is performed to form a new group G. Then, it is determined whether or not to regroup the other groups $G_L$ and G. As a result, groups G corresponding to vehicles can be detected based on the group $G_L$ corresponding to the left and right tail lamps TL of a vehicle.

Therefore, it is possible to accurately detect vehicles including the leading vehicle Vah by accurately grouping position data detected by the position detection unit 9.

The present invention is not limited to the above embodiment and can be modified as appropriate.

What is claimed is:

1. A vehicle detection apparatus, comprising:
a processor configured to perform the following units:
a position detection unit that detects position data including distance information in a real space of each pixel in an image captured by an imaging unit;
a lamp candidate extraction unit that, based on a value of the pixel, extracts a pixel region in the image, as a lamp candidate, the pixel region being likely to correspond to a tail lamp of a vehicle;
a grouping unit that perfoms grouping to make points close to each other in the real space a group based on the distance information in the real space detected by the position detection unit; and
a regrouping unit that perfoms regrouping to make groups which are close within a predetermined distance from each other in the real space a group, wherein
the regrouping unit perfoms the regrouping for the groups which contain the lamp candidate in preference to the groups which do not contain the lamp candidate.

2. The vehicle detection apparatus according to claim 1, wherein, if as a result of the regrouping, the group contains the lamp candidate extracted by the lamp candidate extraction unit, the grouping unit identifies the group as a group corresponding to a rear portion of the vehicle.

3. The vehicle detection apparatus according to claim 1, further comprising a lamp pair candidate extraction unit that extracts a combination of the lamp candidates that correspond to the tail lamps including the left and right tail lamps of the vehicle as a lamp pair candidate from the lamp candidates extracted by the lamp candidate extraction unit based on the distance information in the real space detected by the position detection unit, wherein
if the group contains the lamp pair candidate extracted by the lamp pair candidate extraction unit, the grouping unit forcibly separates the group into the group that contains the lamp pair candidate and the group that does not contain the lamp candidates so as to perform regrouping as the separate groups.

4. The vehicle detection apparatus according to claim 3, wherein
the lamp pair candidate extraction unit selects any of two lamp candidates from among the lamp candidates extracted by the lamp candidate extraction unit, extracts a combination of the two lamp candidates as the lamp pair candidate if a ratio of the number of pixels of one lamp candidate to the number of pixels of the other lamp candidate is within a predetermined range, if a difference the number of pixels in the vertical direction in the image between the two lamp candidates is within a predetermined range, if a distance and a height of the one lamp candidate in a real space are within predetermined ranges from a distance and a height of the other lamp candidates in the real space, or if an interval between the two lamp candidates in a left and right direction in the real space is within a width corresponding to one vehicle, and
performs the extraction processing for all combinations of the lamp candidates extracted by the lamp candidate extraction unit.

5. The vehicle detection apparatus according to claim 3, wherein if there is another lamp candidate between and above left and right lamp candidates which are the extracted lamp pair candidate and positioned above the left and right lamp candidates in the image, the lamp pair candidate extraction unit adds the another lamp candidate to the lamp pair candidate as a high-mounted stop lamp.

6. The vehicle detection apparatus according to claim 5, wherein if the lamp candidate added as the high-mounted stop lamp belongs to another lamp pair candidate other than the lamp pair candidate to which the lamp candidate has been added, the lamp pair candidate extraction unit excludes the added lamp candidate from the lamp pair candidate to which the lamp candidate has been added and also cancels designation of the another lamp pair candidate to which the lamp candidate whose addition is excluded belongs as the lamp pair candidate.

7. The vehicle detection apparatus according to claim 1, wherein the lamp candidate extraction unit extracts the pixels having a brightness equal to or higher than predetermined brightness in the image and, if the extracted pixels are adjacent to each other in the image, integrates the pixels as a same pixel region, calculates the height of the pixel region from a road surface based on the distance information in the real space, and extracts the pixel regions whose height from the road surface is within a predetermined range as the lamp candidates from among the pixel regions.

8. The vehicle detection apparatus according to claim 1, further comprising:
a distance image creation unit that creates a distance image by allocating the distance information in the real space detected by the position detection unit to a corresponding pixel of the image captured by the imaging unit, wherein
the grouping unit divides the distance image created by the distance image creation unit into a plurality of segments in a thin rectangular shape extending in a vertical direction with a predetermined pixel width,
creates a histogram for each of the segments,
calculates a representative distance of the segment by polling the distance information in the real space allocated to each pixel in the lamp candidate for the histogram if the lamp candidate extracted by the lamp candidate extraction unit is present in the segment,
calculates a representative distance of the segment by polling the distance information in the real space allocated to each pixel in the segment for the histogram if there is no lamp candidate extracted by the lamp candidate extraction unit in the segment, and
selects the representative distances for the grouping.

9. The vehicle detection apparatus according to claim 8, wherein in the case where the representative distance of the segment is calculated by polling the distance information in the real space allocated to each pixel in the segment for the histogram when there is not lamp candidate extracted by the lamp candidate extraction unit in the segment, the grouping unit invalidates the calculated representative distance for the segment in which a frequency of a class of the histogram corresponding to the calculated representative distance is smaller than a predetermined value and performs the grouping by assuming that there is no representative distance in the segment.

10. A vehicle detection apparatus, comprising:
a processor configured to perform the following units:
a position detection unit that detects position data including distance information in the real space of each pixel in an image captured by an imaging unit;
a lamp candidate extraction unit that, based on the value of the pixel, extracts a pixel region on the image, as a lamp candidate, the pixel region being likely to correspond to a tail lamp of a vehicle;
a grouping unit that perfoms grouping to make points closed to each other in the real space a group based on the distance information in the real space detected by the position detection unit; and
a regrouping unit that perfoms regrouping to make the groups which are close within a threshold distance from each other in the real space a group, wherein
the regrouping unit sets the threshold distance for peforming the regrouping for the groups which contain the lamp candidate and the threshold distance for peforming the regrouping for the groups which do not contain the lamp candidate, such that the regrouping is performed for the groups which contain the lamp candidate in preference to the groups which do not contain the lamp candidate.

11. The vehicle detection apparatus according to claim 10, wherein, if, as a result of the regrouping, the group contains the lamp candidate extracted by the lamp candidate extraction unit, the grouping unit identifies the group as a group corresponding to a rear portion of the vehicle.

12. The vehicle detection apparatus according to claim 10, further comprising a lamp pair candidate extraction unit that extracts a combination of the lamp candidates that correspond to the tail lamps including the left and right tail lamps of the vehicle as a lamp pair candidate from the lamp candidates extracted by the lamp candidate extraction unit based on the distance information in the real space detected by the position detection unit, wherein
if the group contains the lamp pair candidate extracted by the lamp pair candidate extraction unit, the grouping unit forcibly separates the group into the group that contains the lamp pair candidate and the group that does not contain the lamp candidates so as to perform regrouping as the separate groups.

13. The vehicle detection apparatus according to claim 12, wherein
the lamp pair candidate extraction unit selects any of two lamp candidates from among the lamp candidates extracted by the lamp candidate extraction unit,
extracts a combination of the two lamp candidates as the lamp pair candidate if a ratio of the number of pixels of one lamp candidate to the number of pixels of the other lamp candidate is within a predetermined range, if a difference the number of pixels in a vertical direction in the image between the two lamp candidates is within a predetermined range, if a distance and a height of the one lamp candidate in a real space are within predetermined ranges from a distance and a height of the other lamp candidates in the real space, or if an interval between the two lamp candidates in a left and right direction in the real space is within a width corresponding to one vehicle, and
performs the extraction processing for all combinations of the lamp candidates extracted by the lamp candidate extraction unit.

14. The vehicle detection apparatus according to claim 12, wherein if there is another lamp candidate between and above left and right lamp candidates which are the extracted lamp pair candidate and positioned above the left and right lamp candidates in the image, the lamp pair candidate extraction unit adds the another lamp candidate to the lamp pair candidate as a high-mounted stop lamp.

15. The vehicle detection apparatus according to claim 14, wherein if the lamp candidate added as the high-mounted stop lamp belongs to another lamp pair candidate other than the lamp pair candidate to which the lamp candidate has been added, the lamp pair candidate extraction unit excludes the added lamp candidate from the lamp pair candidate to which the lamp candidate has been added and also cancels designation of the another lamp pair candidate to which the lamp candidate whose addition is excluded belongs as the lamp pair candidate.

16. The vehicle detection apparatus according to claim 10, wherein the lamp candidate extraction unit extracts the pixels having a brightness equal to or higher than predetermined brightness in the image and, if the extracted pixels are adjacent to each other in the image, integrates the pixels as a same pixel region, calculates the height of the pixel region from a road surface based on the distance information in the real space, and extracts the pixel regions whose height from the road surface is within a predetermined range as the lamp candidates from among the pixel regions.

17. The vehicle detection apparatus according to claim 10, further comprising:
a distance image creation unit that creates a distance image by allocating the distance information in the real space detected by the position detection unit to a corresponding pixel of the image captured by the imaging unit, wherein
the grouping unit divides the distance image created by the distance image creation unit into a plurality of segments in a thin rectangular shape extending in the vertical direction with a predetermined pixel width,
creates a histogram for each of the segments,
calculates a representative distance of the segment by polling the distance information in the real space allocated to each pixel in the lamp candidate for the histogram if the lamp candidate extracted by the lamp candidate extraction unit is present in the segment,
calculates a representative distance of the segment by polling the distance information in the real space allocated to each pixel in the segment for the histogram if there is no lamp candidate extracted by the lamp candidate extraction unit in the segment, and
selects the representative distances for the grouping.

18. The vehicle detection apparatus according to claim 17, wherein in the case where the representative distance of the segment is calculated by polling the distance information in the real space allocated to each pixel in the segment for the histogram when there is not lamp candidate extracted by the lamp candidate extraction unit in the segment, the grouping unit invalidates the calculated representative distance for the segment in which a frequency of a class of the histogram corresponding to the calculated representative distance is smaller than a predetermined value and performs the grouping by assuming that there is no representative distance in the segment.

19. A vehicle detection apparatus, comprising:
a processor configured to perform the following units:
a position detection unit that detects position data including a distance of each pixel in an image captured by an imaging unit;
an integration processing unit that extracts the pixels having a brightness equal to or higher than predetermined brightness on the image and, if the extracted pixels are adjacent to each other on the image, integrates the pixels as a same pixel region;
a lamp candidate extraction unit that extracts the pixel region that correspond to a tail lamp of a vehicle from among the pixel regions integrated by the integration processing unit as a lamp candidate based on the position data detected by the position detection unit; and
a grouping unit that groups position data detected by the position detection unit, determines whether o regroup the generated groups containing the position data belonging to the lamp candidate extracted by the lamp candidate extraction unit, after regrouping the groups determined to be capable of being regrouped, determines whether to regroup all the groups, and then regroups the groups determined to be capable of being regrouped, wherein upon regrouping processing by the grouping unit, a threshold about the position data used for the regrouping of the groups containing the position data belonging to the lamp candidate is set easier for the regrouping than a threshold about the position data for the subsequent regrouping of all the groups.

* * * * *